United States Patent [19]
Horiguchi et al.

[11] Patent Number: 5,383,170
[45] Date of Patent: Jan. 17, 1995

[54] OPTICAL CARD RECORDING/REPRODUCING APPARATUS WHEREIN A DATA PROCESS IS MADE DURING AN ACCESS OPERATION

[75] Inventors: Toshio Horiguchi, Hachioji; Hisakatsu Tanaka, Chofu, both of Japan

[73] Assignee: Olympus Optical Co., Ltd., Tokyo, Japan

[21] Appl. No.: 134,876

[22] Filed: Oct. 12, 1993

Related U.S. Application Data

[63] Continuation of Ser. No. 786,654, Nov. 1, 1991, abandoned.

[30] Foreign Application Priority Data

Nov. 2, 1990 [JP] Japan .................. 2-298452
Jan. 30, 1991 [JP] Japan .................. 3-009705

[51] Int. Cl.⁶ .................................. G11B 7/00
[52] U.S. Cl. .......................... 369/44.28; 235/454
[58] Field of Search ............... 235/454, 437, 454; 369/44.28, 32, 44.27, 54, 58, 124, 48

[56] References Cited

U.S. PATENT DOCUMENTS

| | | | |
|---|---|---|---|
| 4,852,101 | 7/1989 | Kobayashi et al. | 235/437 |
| 4,860,272 | 8/1989 | Nishikawa et al. | 369/48 |
| 4,864,113 | 9/1989 | Ogura | 235/477 |
| 4,896,025 | 1/1990 | Hasegawa | 235/437 |
| 5,132,522 | 7/1992 | Oshiba | 235/437 |
| 5,267,226 | 11/1993 | Matsuoka et al. | 235/454 |

FOREIGN PATENT DOCUMENTS

| | | |
|---|---|---|
| 301108 | 1/1989 | European Pat. Off. |
| 62-131317 | 6/1987 | Japan |
| 63-37876 | 2/1988 | Japan |
| 2205423 | 12/1988 | United Kingdom |

*Primary Examiner*—Aristotelis Psitos
*Assistant Examiner*—P. W. Huber
*Attorney, Agent, or Firm*—Armstrong, Westerman, Hattori, McLeland & Naughton

[57] ABSTRACT

A recording/reproducing apparatus for recording/reproducing data by relatively moving either of an optical card and optical head wherein, in order that data may be recorded/reproduced on the optical card by moving either of the optical head and optical card, during an access operation to gain access to reach a target track, such data process as adding data for detecting and correcting errors to data to be recorded in the optical card by a data encoding circuit or correcting errors on data already read out by an error correcting circuit is made in parallel. The data are also transferred during the access operation.

12 Claims, 18 Drawing Sheets

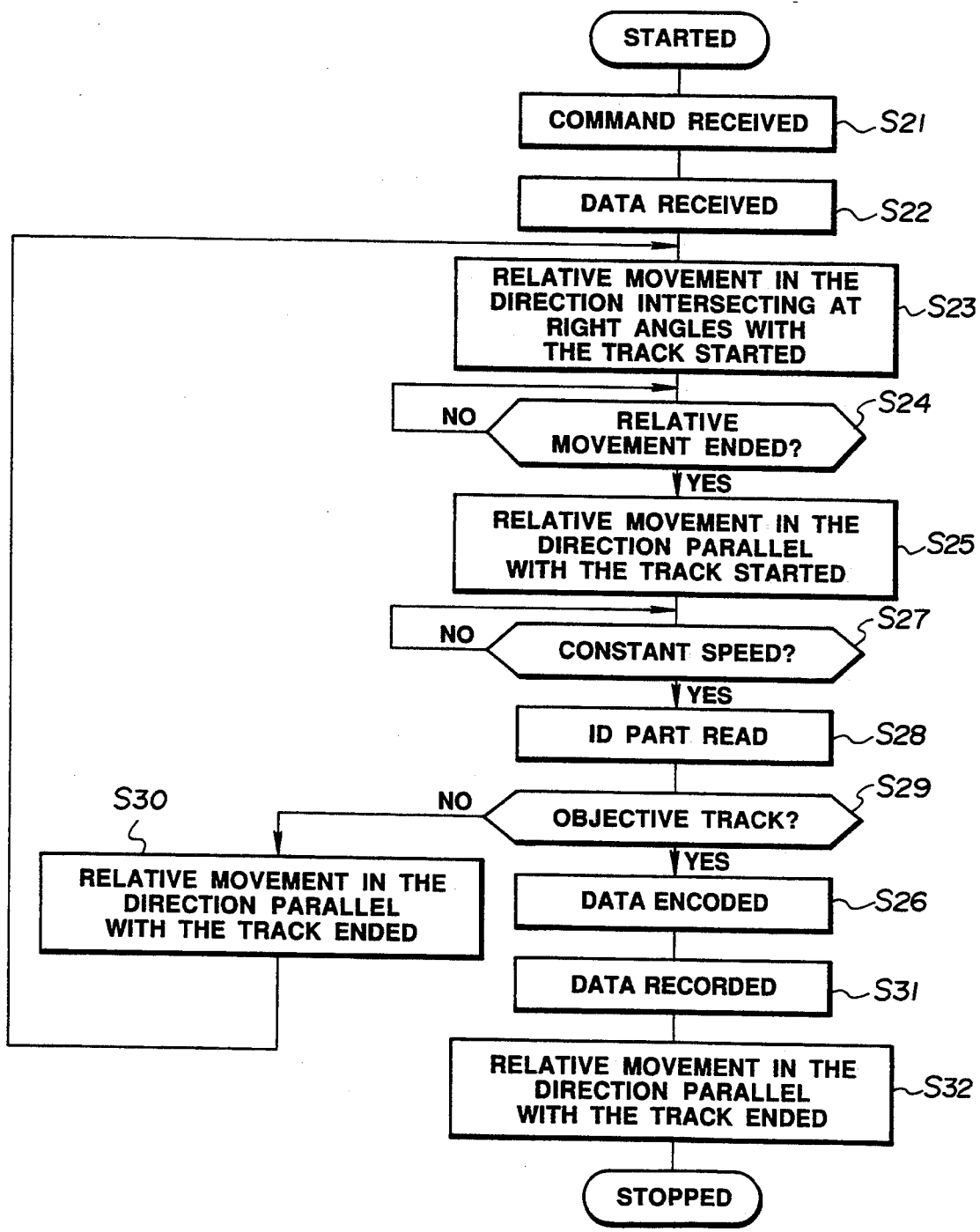

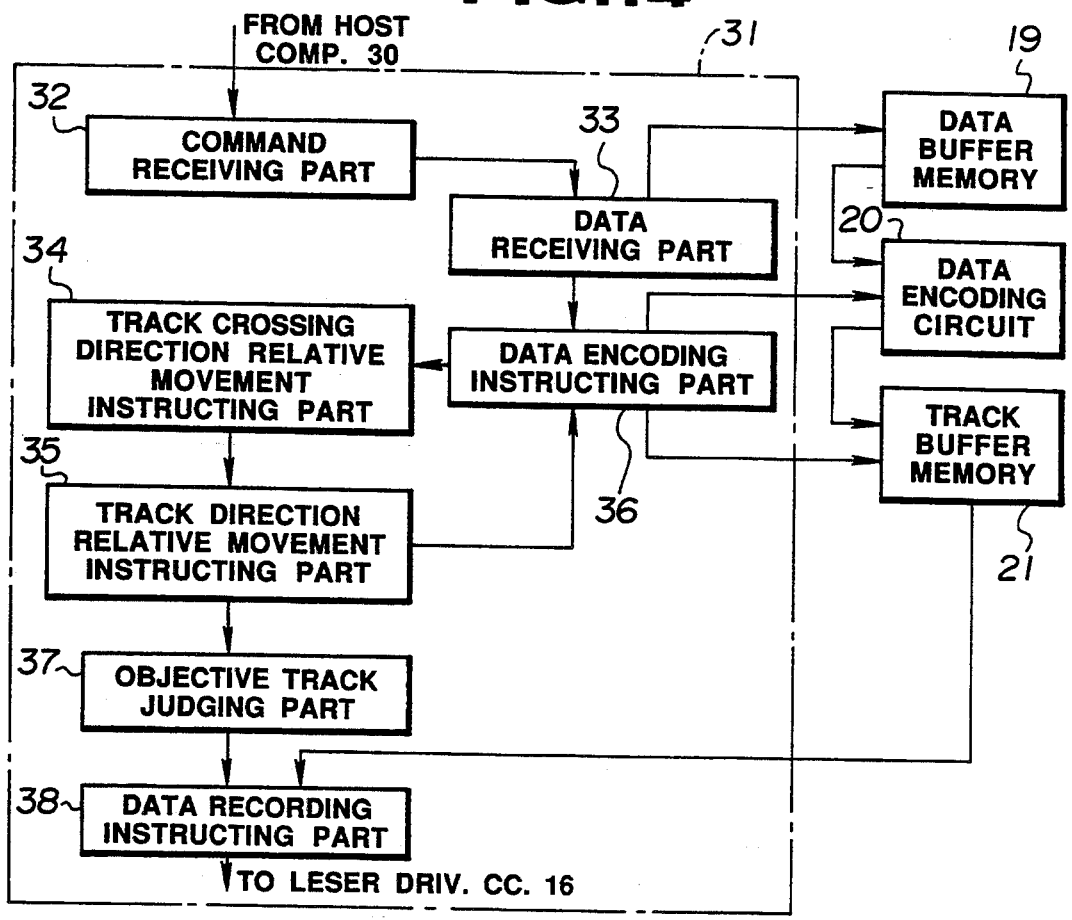
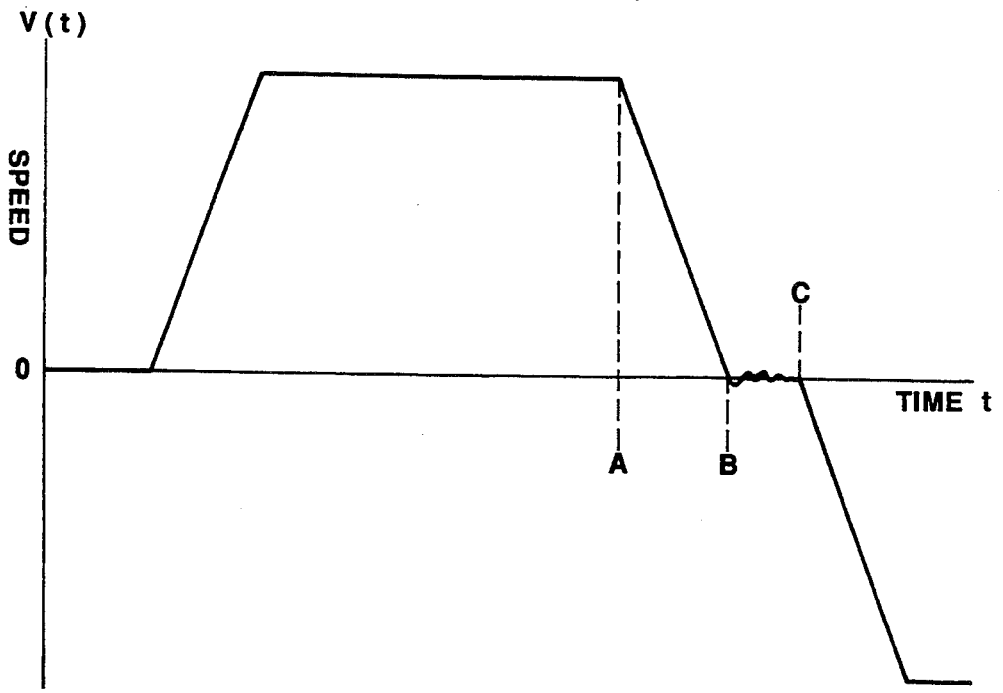

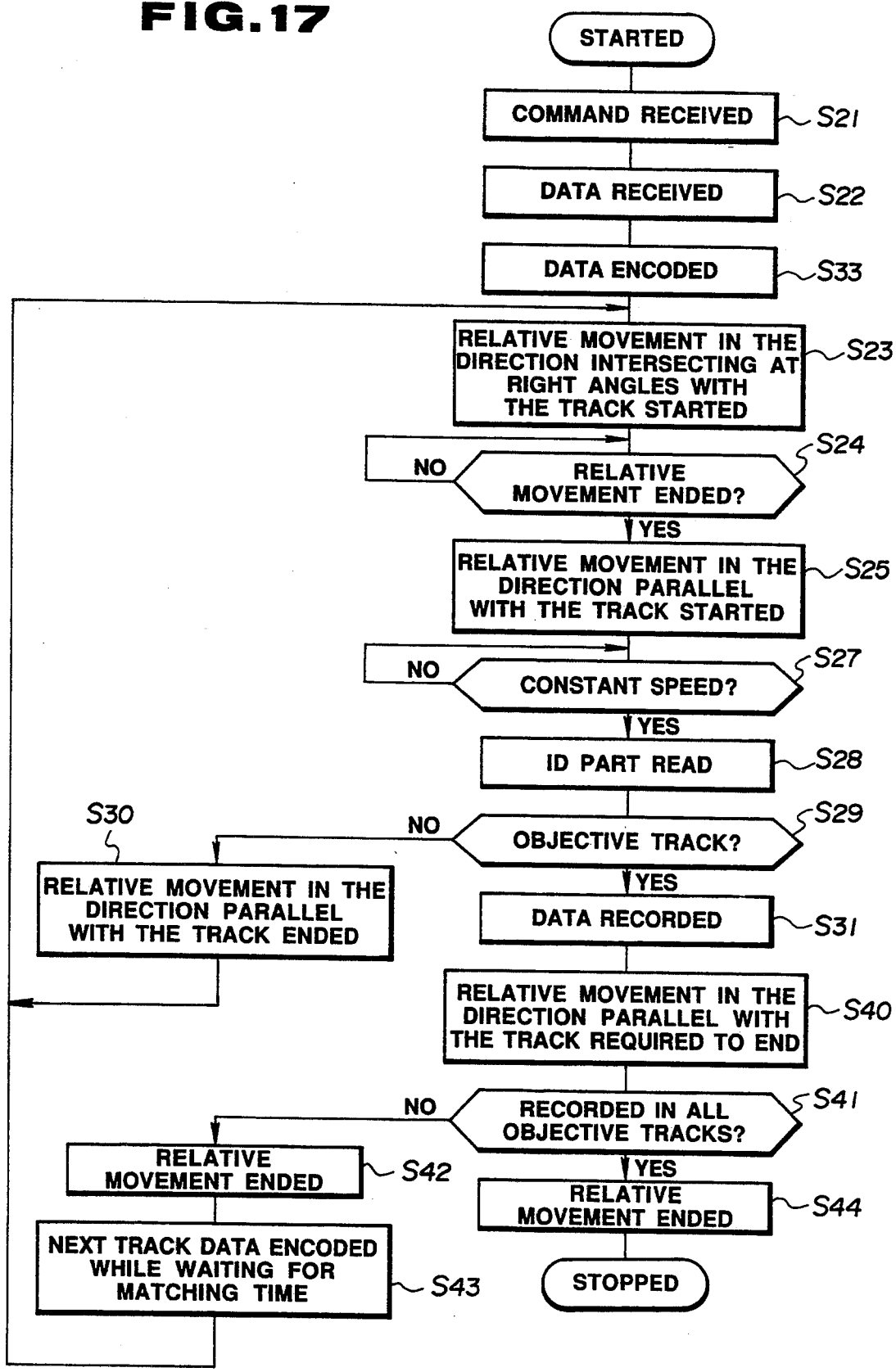

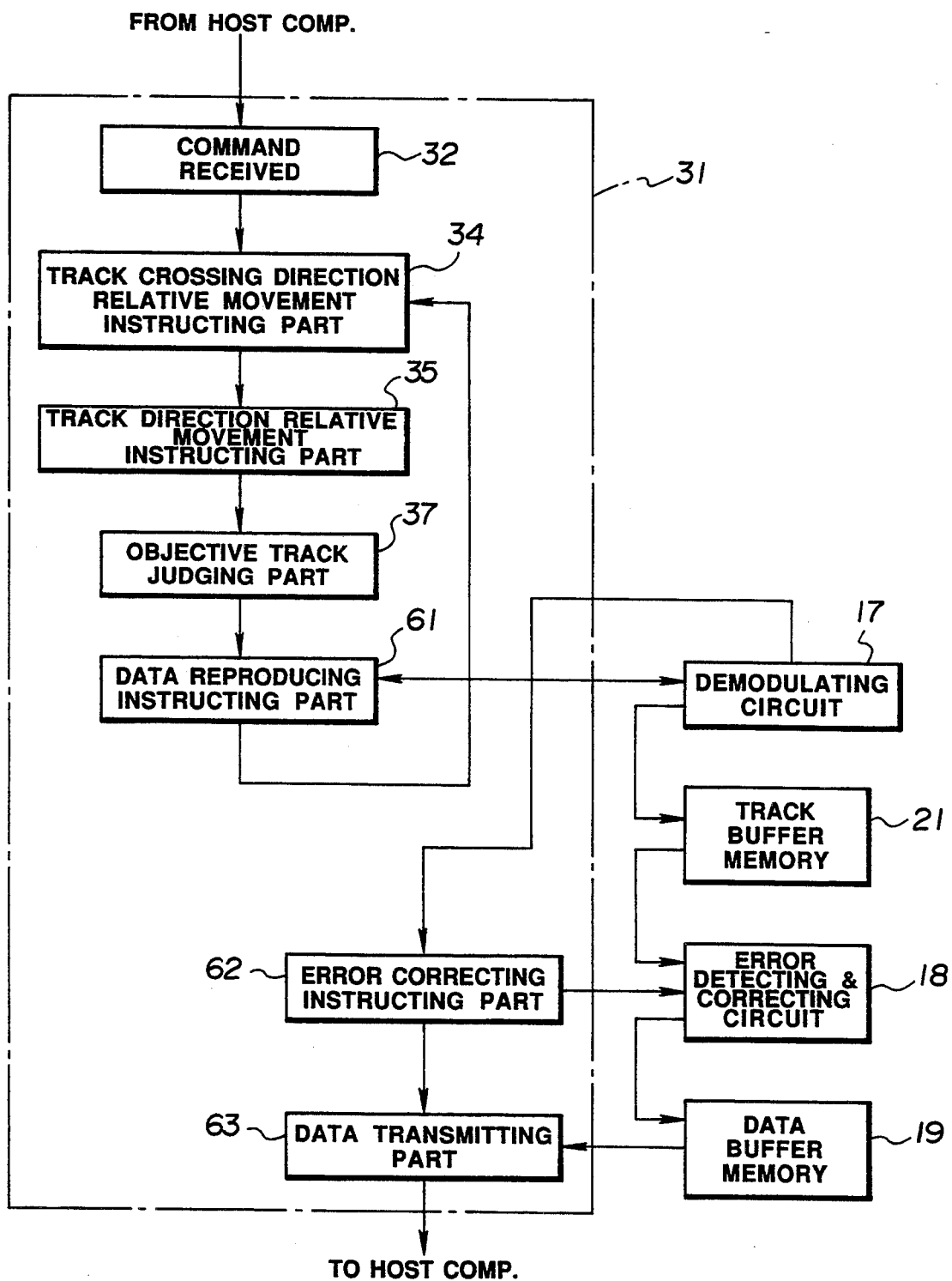

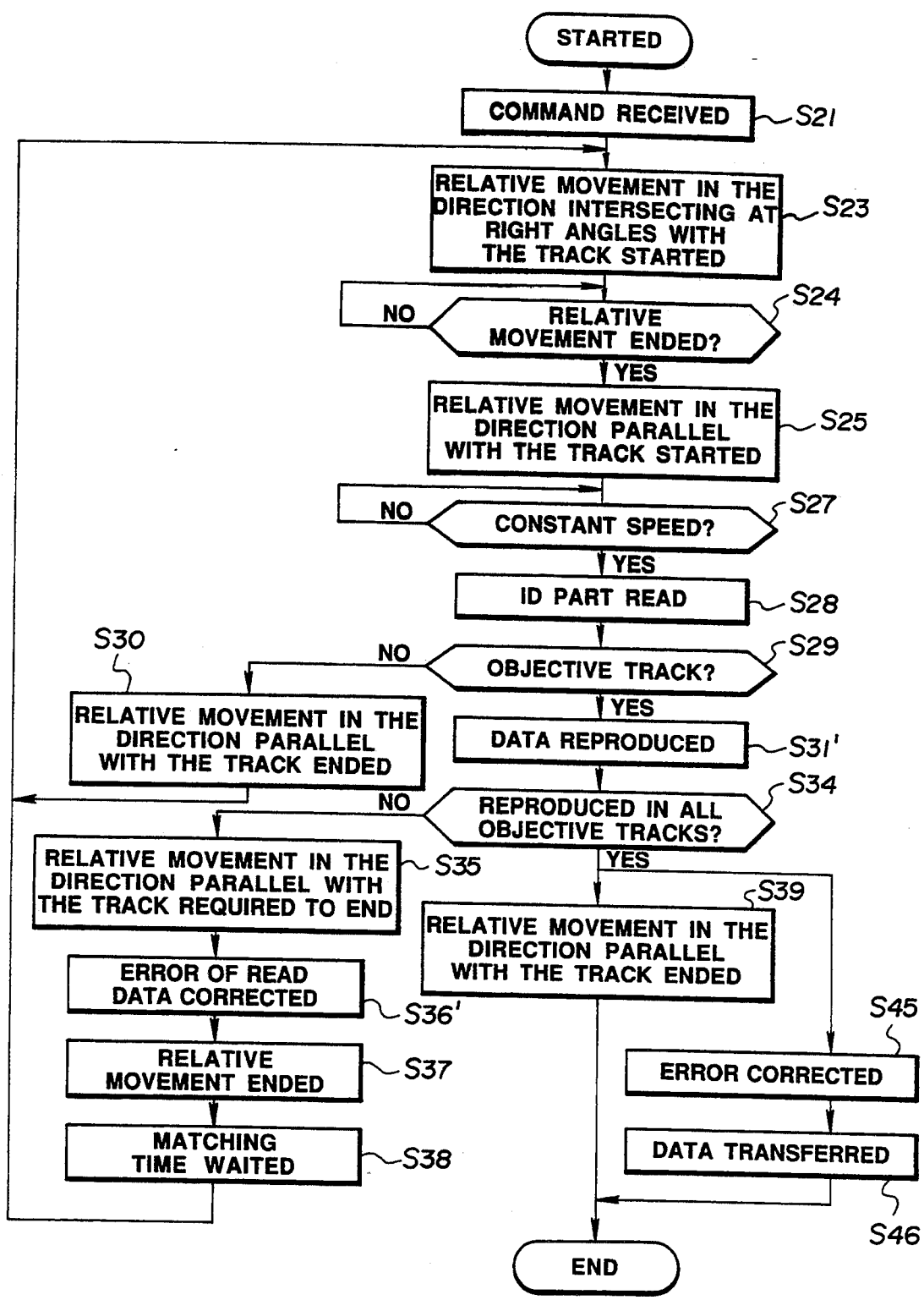

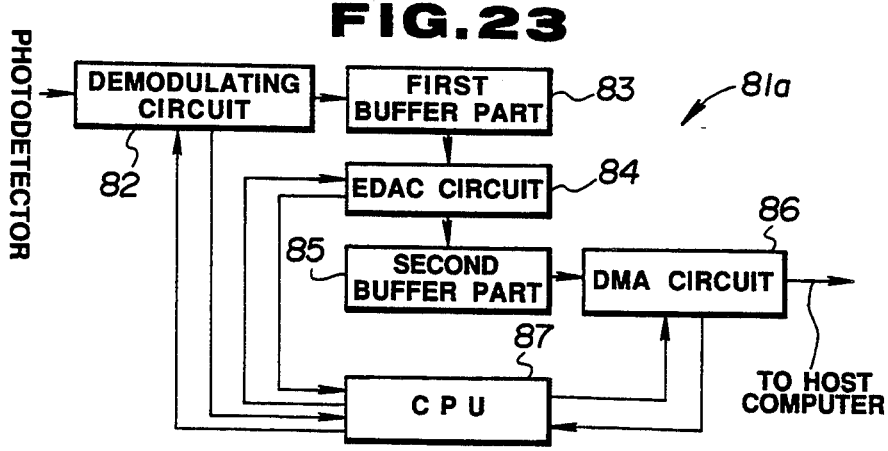
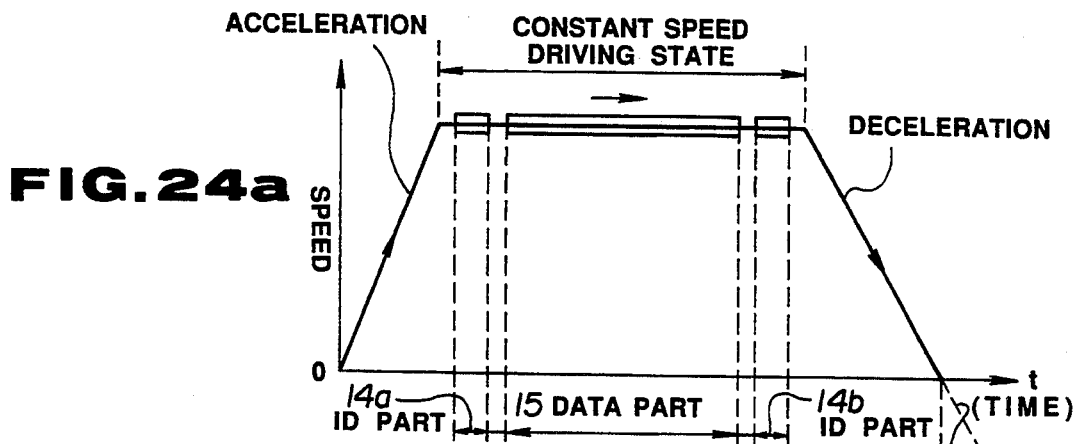
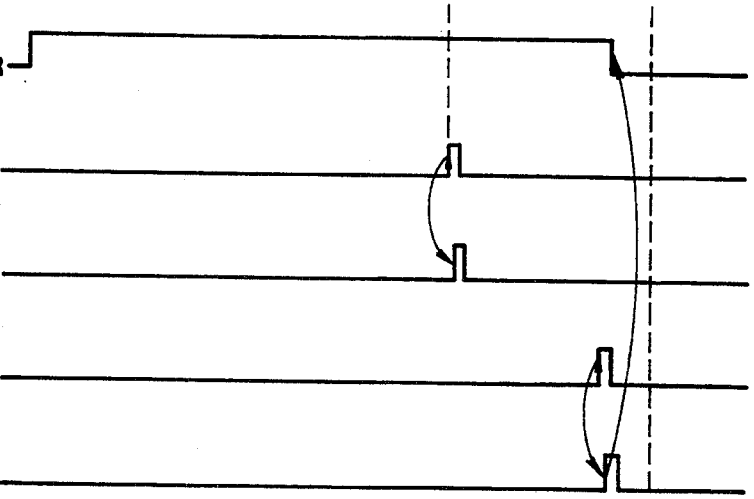

OPTICAL CARD RECORDING/REPRODUCING APPARATUS WHEREIN A DATA PROCESS IS MADE DURING AN ACCESS OPERATION

This application is a continuation of application Ser. No. 07/7876,654 filed Nov. 1, 1991, now abandoned.

BACKGROUND OF THE INVENTION

1. Field of the Invention

This invention relates to an optical card recording/reproducing apparatus wherein such data process as an encoding process or data transfer is made during an access operation or the like.

2. Description of the Prior Art

An optical card-like recording medium has a recording capacity several thousand to ten thousand times as large as that of a magnetic card. However, it cannot be re-written the same as an optical disc. Its recording capacity is so large, typically 1 to 2M bytes, that it is considered to provide a wide application range as a bank deposit book, portable atlas or shopping prepaid card.

Also, since it cannot be re-written, the optical card is considered to be applied to a personal health control card in which data are not allowed to be altered.

Various kinds of such optical card have been already suggested. For example, an optical card disclosed in the publication of Japanese patent application laid open No.37876/1988 is shown in FIG. 1.

As shown in FIG. 1, in an optical card 1, ID parts 4A and 4B contain information showing addresses corresponding to respective tracks. To parts 4A, 4B are recorded so as to be able to be read out in the directions opposite to each other and are provided in both end parts of an optical recording part 3. Recording part 3 has a plurality of tracks 2 parallel with each other and a data part 5 for recording data is provided between these ID parts 4A and 4B. Therefore, for example, when the optical card 1 is moving from left to right in the track direction in FIG. 1 with respect to an optical head, the left side ID part 4A will be read out and, when it is moving from right to left, the right side ID part 4B will be read out so that the track address information corresponding to the track may be identified. The above mentioned ID parts 4A and 4B are provided in the positions inside for fixed distances (for example, of 4 mm) from the card ends in order to prevent the influence of a flaw or stain at the card end and to better stabilize the relative moving speed in the track direction of the optical card 1 and optical head. By the way, the ID parts 4A and 4B are pre-recorded in advance when the optical card is made.

The optical card recording/reproducing apparatus of a prior art example using the above mentioned optical card is formed as shown, for example, in FIG. 2.

So that an optical head 12 may relatively move in the direction parallel with the track of the optical card 1, a controller 11 is connected with a motor servo circuit 13 for moving the above mentioned optical card 1, an optical head driving circuit 14 relatively moving the above mentioned optical head 12 in the direction intersecting at right angles with the track of the optical card 1, a focus & track servo circuit 15 driving an objective lens within the above mentioned optical head 12 in the focus and tracking direction and making an incident light always as focused follow the track of the optical card 1, a laser driving circuit 16 controlling the above mentioned optical head 12 in order to write data into the optical card 1, an error detecting & correcting circuit 18 detecting and correcting errors in the data read out of the above mentioned optical head 12 and demodulated by a demodulating circuit 17, a data buffer memory 19 temporarily memorizing the data transmitted from a host computer (not illustrated), a data encoding circuit 20 adding redundant data for detecting and correcting errors to the above mentioned data and a track buffer memory 21 for temporarily memorizing the encoded data to control them to record/reproduce data.

The operation of the optical card recording/reproducing apparatus of such prior art example in recording data shall be explained with reference to the apparatus in FIG. 2 and the flow chart in FIG. 3.

In recording data in the optical card 1, first of all, in the step S1, the controller 11 receives a command from the above mentioned host computer. It is interpreted to be a command to record data. Then, in the step S2, the data to be recorded are received from the host computer and are temporarily memorized in the data buffer memory 19. Then, in the step S3, the data, for example, for one track are read out of the data buffer memory 19 and are encoded by adding redundant data for detecting and correcting errors by using the data encoding circuit 20 and the encoded data are temporarily memorized in the track buffer memory 21.

Then, in the step S4, the controller 11 calculates the moving amount of the optical head 12 from the track number in which the optical head 12 is now positioned and the objective track number to be recorded transmitted together with the above mentioned command from the host computer and instructs the optical head driving circuit 14 to relatively move the optical head 12 in the direction intersecting at right angles with the track of the optical card 1 and, in the step S5, it is judged whether the above mentioned relative movement has ended or not. Then, in the step S6, the motor servo circuit 13 is instructed to relatively move the optical card 1 so that the optical head 12 may relatively move in the direction parallel with the track of the optical card 1.

Then, in the step S7, the controller 11 monitors the signals from the motor servo circuit 13 and judges whether the relative moving speed of the optical head 12 and optical card 1 is constant or not and, in the step S8, the ID part 4A of such optical card 1 as is shown in FIG. 1 is read out by using the demodulating circuit 17 and error detecting & correcting circuit 18. Then, in the step S9, the track number of the above mentioned read ID part 4A and the objective track number to be recorded are compared with each other. In case they are different, the process will proceed to the step S10 in which the motor servo circuit 13 is instructed to stop the relative movement of the optical head 12 and optical card 1. The operations from the step S4 to the step S9 are repeated again.

In case the track number coincide with the objective track number to be recorded, the process will proceed to the step S11 wherein the above mentioned encoded data to be recorded are read out of the track buffer memory 21 and a high output recording light beam is output as modulated in response to the above mentioned data from the optical head 12 through the laser driving circuit 16 and is controlled to record the data in the above mentioned objective track. In the step S12, the motor servo circuit 13 is instructed to stop the relative movement of the optical head 12 and optical card 1.

Further, in the step S13, a fixed matching time is waited to perfectly stop the optical card 1.

Here, in the step S14, it is confirmed whether the data have been recorded in all the objective tracks required from the host computer or not. If they have been recorded, the recording of the data will end. If the recording is not yet completed in all the objective tracks, the process will proceed to the step S3 wherein the data to be recorded in the next track are read out of the data buffer memory 19. The operations from the step S3 to the step S14 are repeated. Thereafter, the operations for the number of tracks required from the host computer are repeated to end all the recording of the data.

However, generally, as compared with a recording/reproducing apparatus using such disc type recording medium as an optical disc, in an optical card recording/reproducing apparatus, for example, an access operation for an optical head to reach an objective track takes a longer time and, therefore, the time from a command to record data is received until the recording in the medium is started is also longer and should be improved.

Particularly, in such optical card recording/reproducing apparatus of the prior art example, as described above, the process from a time when a command to record data is received until the data are recorded in a medium is made in series and, therefore, the time for recording the data is undesirably long.

On the other hand, in the publication of Japanese patent application laid open No.131317/1987 is suggested a technique of reading data out of an optical card and transferring them to a host computer.

In the optical card apparatus, in reading out data, an optical head is made to seek a target track on an optical card, then the optical card is driven at a constant speed and information is read out of a data part in which the information is recorded. The data read out are demodulated and are stored in a buffer memory part. After the data are stored, a host computer then transfer them, and the data are transferred to the host computer.

Also, in the optical card apparatus, after the optical card is moved in one direction and reading the data out of a linear track is completed, the optical card moving direction is revised and, after a constant speed is reached, the next reading is made. In the apparatus of the prior art example, in preparation for the next reading, the data stored in the buffer memory part are transferred until the optical card reaches a constant speed from the turned drive so as to improve the efficiency of the data transfer.

However, in this optical card apparatus, without correcting errors of the read out data, the data are transferred to the host computer as an external apparatus and further, since the optical card is turned and driven until just before the constant speed is reached, the data transfer takes time. Therefore, on the host computer side, if the data error correction is included, much time will be required for the communication with the optical card apparatus. Thus, in the optical card apparatus of the prior art example, the time for access to the host computer is relatively long while, on the host computer side, the time for other processes is short.

SUMMARY OF THE INVENTION

An object of the present invention is to provide an optical card recording/reproducing apparatus wherein the time from when a command to record/reproduce data is received until the data are recorded/reproduced in an optical card can be desirably reduced.

Another object of the present invention is to provide an optical card recording/reproducing apparatus wherein the time for transferring data to a host computer can be desirably reduced.

The optical card recording/reproducing apparatus according to the present invention is to record/reproduce data by relatively moving either an optical card or an optical head, comprises an access means moving either the above mentioned optical head or the optical card to reach a target track recording/reproducing data on the optical card and a data encoding/error correcting means for adding data encoding error detecting and correcting data to the data to be recorded in the above mentioned optical card for correcting errors in the data read out of the above mentioned optical card, wherein data processes such as the above mentioned data encoding/error correcting process are conducted in parallel during the access operation for reaching the above mentioned target track and can also conduct in parallel a process of transferring the error corrected data to the host computer during the access operation.

BRIEF DESCRIPTION OF THE DRAWINGS

FIG. 4 is a block diagram showing a schematic formation of an optical card recording/reproducing apparatus of the first embodiment.

FIG. 5 is a functional block diagram at the time of recording data of a controller.

FIG. 6 is an explanatory view showing relations between tracks and beams.

FIG. 7 is an explanatory view showing relations between photodetectors and reflected beams.

FIG. 8 is an explanatory diagram showing relations between the positions of an optical card and incident lights and reflected lights.

FIG. 9 is a flow chart showing the operation at the time of recording data of the optical card recording/reproducing apparatus of the first embodiment.

FIG. 10 is an explanatory diagram showing the relation between the time and relative moving speed when an optical head is relatively moved in the direction parallel with the track of an optical card.

FIG. 13 is a flow chart showing the operation at the time of recording data in the third embodiment of the present invention.

FIG. 14 is a functional block diagram at the time of recording data of a controller in the fourth embodiment of the present invention.

FIG. 16 is an explanatory diagram showing the relation between the time and relative moving speed when an optical head is relatively moved in the direction parallel with the track of an optical card.

FIG. 17 is a flow chart showing the operation at the time of recording data in the fifth embodiment of the present invention.

FIGS. 18 and 19 relate to the sixth embodiment of the present invention.

FIG. 18 is a functional block diagram at the time of reproducing data of a controller in the sixth embodiment.

FIG. 19 is a flow chart showing the operation at the time of reproducing data in the sixth embodiment.

Figure 20:
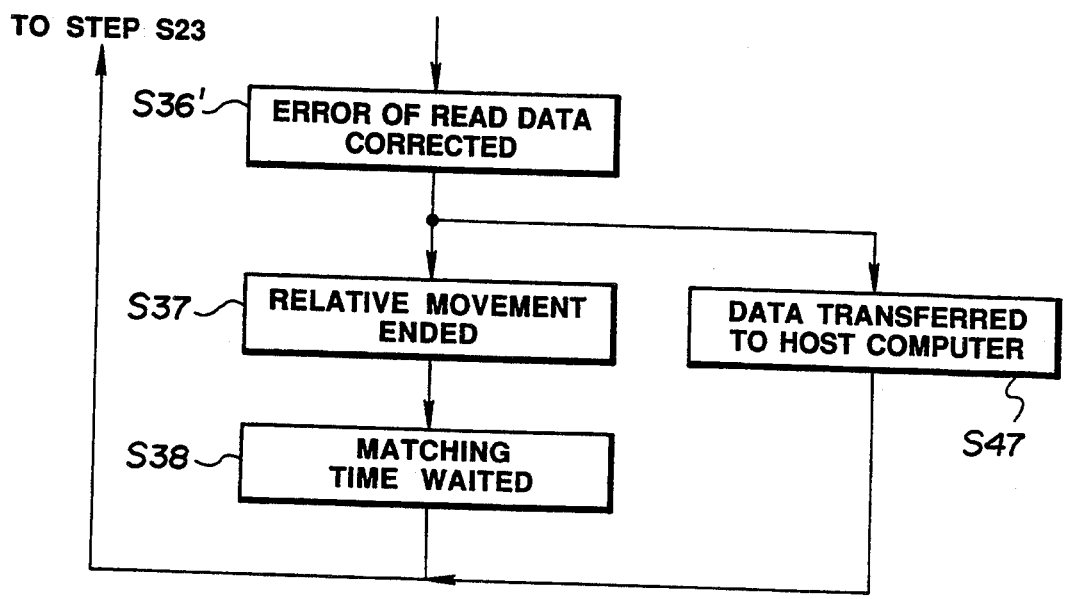
Figure 21:
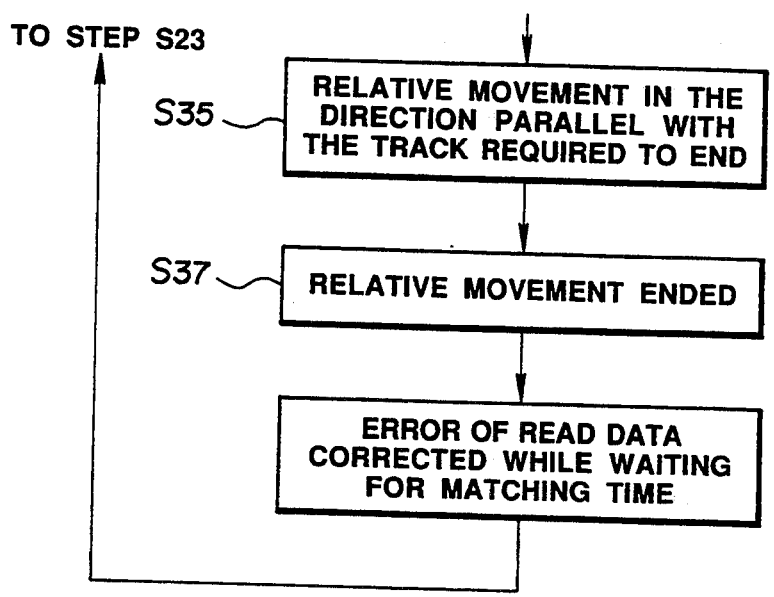

Each of FIGS. 20 and 21 is a flow chart showing a part of the operation at the time of reproducing data in a modification of the sixth embodiment.

Figure 22:
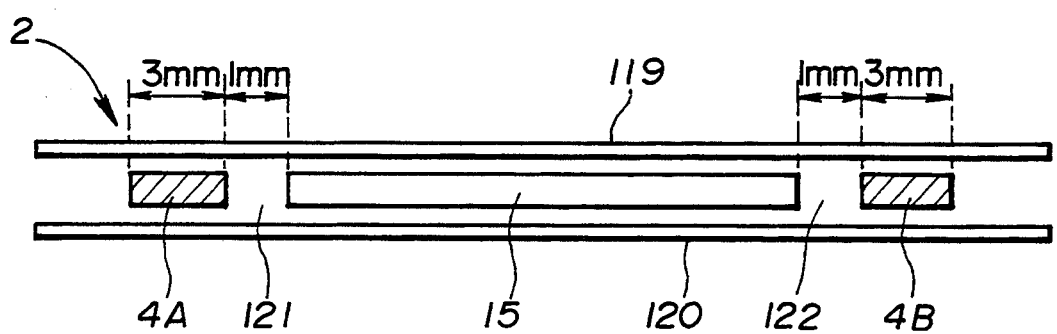

FIGS. 22 to 24 relate to the seventh embodiment of the present invention.

FIG. 22 is a magnified view of one track of an optical card.

FIG. 23 is a schematic formation diagram of an optical card apparatus.

FIGS. 24(a)–24(f) are explanatory diagrams showing a data transmitting operation of an optical card apparatus.

DETAILED DESCRIPTION OF THE PREFERRED EMBODIMENTS

The embodiments of the present invention shall be explained in the following with reference to the drawings.

Figure 1:
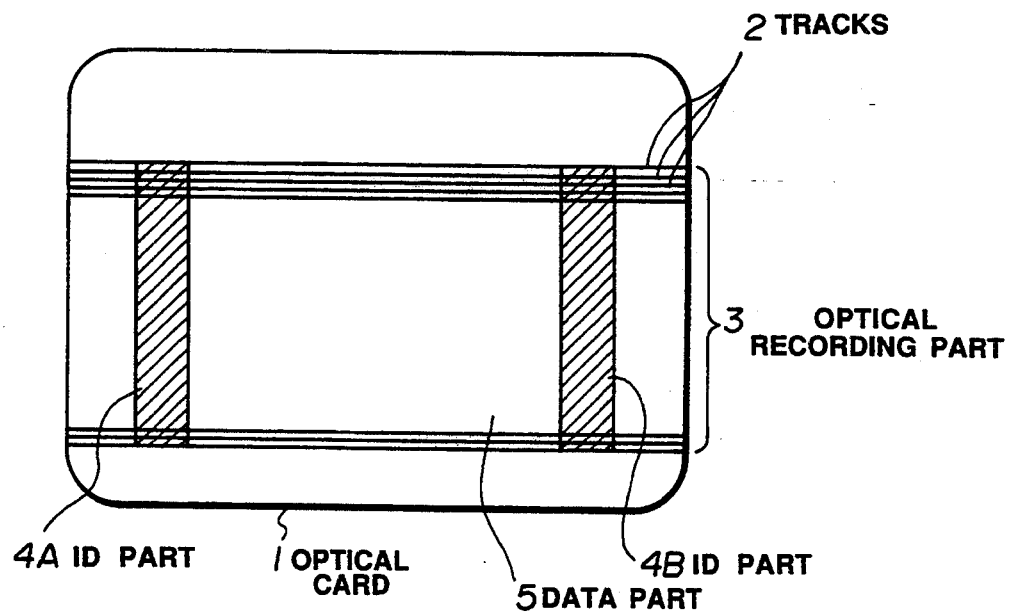
FIG. 1 is an explanatory view of an optical card of a prior art example.
Figure 4:
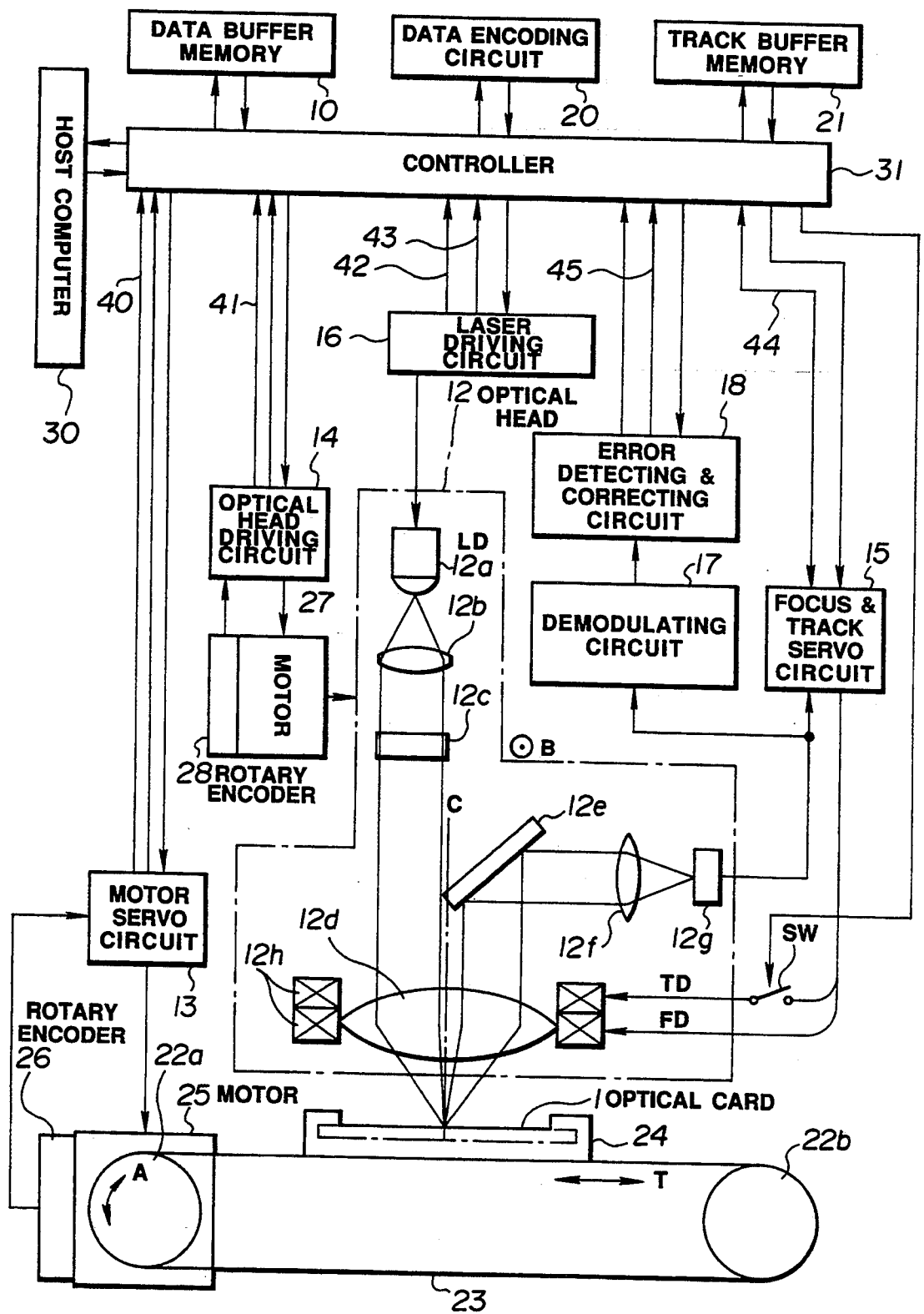

As shown in FIG. 4, in an optical card recording/reproducing apparatus of the first embodiment, such optical card 1 as shown, for example, in FIG. 1 can be fitted to a shuttle 24 provided in a predetermined position on a conveyer belt 23 hung between pulleys 22a and 22b. This conveyer belt 23 is moved by a motor 25 forming an optical card conveying means and a driving signal is fed to this motor 25 by a motor servo circuit 13 so that the pulley 22a fitted to the rotary shaft of this motor 25 may be rotated and driven clockwise and counterclockwise A. By the rotation of this pulley 22a, the optical card 1 is reciprocated and conveyed in the direction (track direction) T parallel with the track.

In this embodiment, the optical card 1 is moved in the track direction T but it is apparent that the optical head 12 may instead be moved in the track direction.

A rotary encoder 26 for detecting the relative position in the track direction with the optical head 12 of the shuttle 24 is connected to the above mentioned motor 25. One pulse of this rotary encoder 26 corresponds to a relative moving amount of 50 $\mu$m of the shuttle 24, for example, for the optical head 12. The above mentioned motor servo circuit 13 is connected to the motor 25, rotary encoder 26 and controller 31 and, by the position information of a pulse signal or the like output from the above mentioned rotary encoder 26, so that the conveying speed may be a constant speed between the ID parts 4A and 4B in FIG. 1 of the optical card 1, a control instruction is sent to the motor servo circuit 13 from the controller 31 to control the motor 25.

Also, the optical head 12 is connected with a motor 27 forming an optical head moving means through a feeding screw (not illustrated) so that, when this motor 27 is driven, the optical head 12 will move in the track crossing direction (the direction perpendicular to the paper surface in FIG. 4 mentioned also as the track crossing direction) B intersecting at right angles with the track of the optical card 1. It is apparent that, without moving the optical head 12, the optical card 1 may be moved in the track crossing direction B.

A rotary encoder 28 for detecting the position in the track crossing direction B of the optical card 1 is connected to the above mentioned motor 27 the same as in the motor 25. One pulse of this rotary encoder 28 corresponds to a relative moving amount of 50 $\mu$m in the direction intersecting at right angles with the track of the optical head 12, for example, for the optical card 1. Also, the above mentioned motor 27 and rotary encoder 28 are connected to the controller 31 through the optical head driving circuit 14 so that, on the basis of the position information or the like from the above mentioned rotary encoder 28, a control instruction may be sent to the optical head driving circuit 14 from the controller 31 to control the rotation of the motor 27 and the optical head 12 may be set near the position opposed to the target track.

In other words, when the optical head 12 is moved in the track crossing direction B under the control of the controller 31, access to any track will be able to be gained (strictly speaking, coarse access, that is, to the vicinity of the target track will be gained).

For example, an case the optical head 12 gains access to a target track different from the present track from which data are being read to make a recording or reproduction, the controller will calculate the moving distance from the track difference between the present track and target track, that is, from the number of tracks to be crossed, and will drive the motor 27 through the optical head driving circuit 14 to make the movement for this distance. When the pulses output from the rotary encoder 28 are counted and the number of pulses corresponding to the above mentioned distance is detected, the motor 27 will be stopped and the optical head 12 will be stopped together with it.

After this coarse access, a tracking state is set, the optical card 1 is moved, the track address information of the ID part 4A or 4B is read out and it is judged whether this read out track address information coincides with the track address information of the target track or not (in a target track judging part 37). In case it is judged to coincide, access to the target track will be recognized to have been obtained. On the other hand, in case it does not coincide, the controller 31 will again control the optical head 12 or objective lens 12d to be moved in the track crossing direction B toward the target track. Repetition of this operation will provide access to the target track in the mean time.

The optical system of the above mentioned optical head 12 is here of a formation called an "axis deviating method". The light beams radiated from the laser diode 12a connected to the controller 31 through the laser driving circuit 16 outputting a laser driving signal are made parallel beams by the collimator lens 12b, are divided into a total of three beams of one 0-dimensional beam and two ±1-dimensional beams by the diffraction grating 12c and are incident with the center of the beams in a position deviated from the optical axis C of the objective lens 12d.

Figure 6:
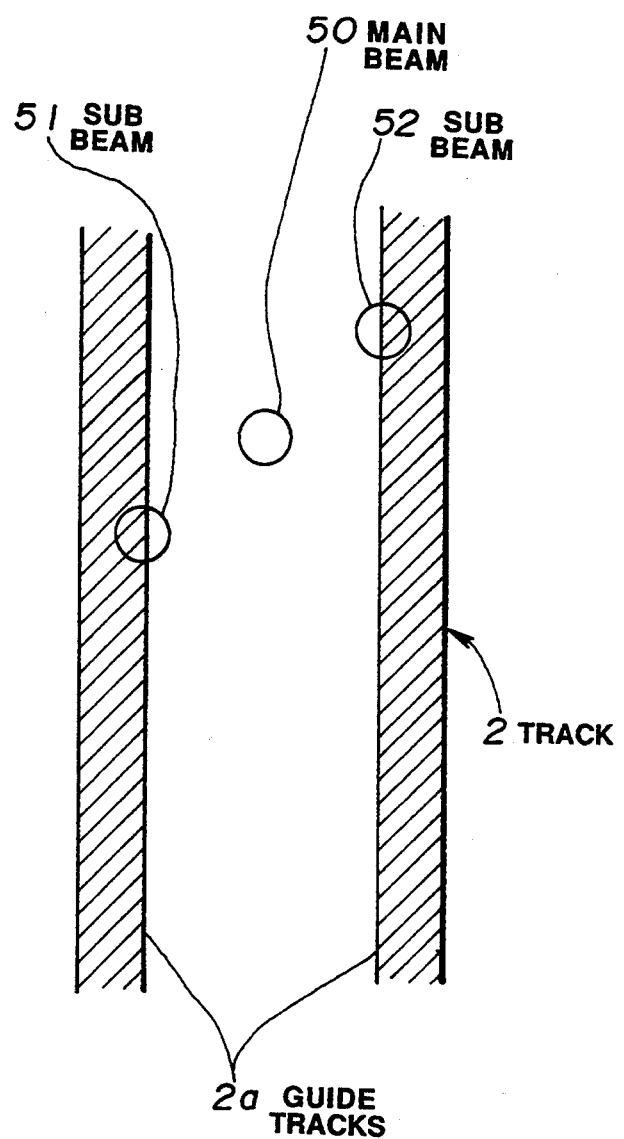

The three beams condensed by the objective lens 12d form on the signal recording surface of the optical card 1 three minute beam spots by a main beam 50 and sub-beams 51 and 52 as shown in FIG. 6. Of these three beam spots, the sub-beams 51 and 52 are in the lengthwise direction of the track 22 while slightly intersecting with the guide tracks 2a provided, respectively, on both side surface parts of the tracks. The main beam spot by the main beam 50 is arranged in the center, the sub-beam spots by the sub-beams 51 and 52 are arranged on both sides and they are condensed on the signal recording surface of the card 1 while being arranged in a train (obliquely in the track direction).

The reflected beam from the optical card 1 passes again through the objective lens 12d, the direction of the beam is changed by 90 degrees by the mirror 12e and an image is formed on the photodetector 12g by the image forming lens 12f.

Figure 7:
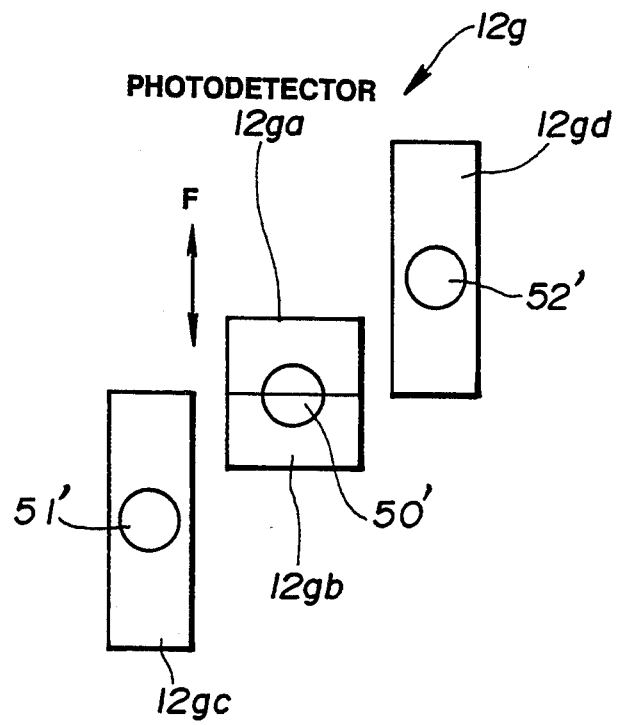

As shown in FIG. 7, the above mentioned photodetector 12g is formed of a plurality of detectors. The photodetector 12g is provided in the middle with focus error signal detecting photodetectors 12ga and 12gb consisting of two divided light receiving devices. Tracking error signal detecting photodetectors 12gc and 12gd are provided on both sides of these photodetectors 12gc and 12gd. The main beam 50'; which is a reflected light of the main beam 50 in the middle of the three reflected beams from the above mentioned optical card 1 is radiated to the photodetectors 12ga and 12gb. The sub-beams 51' and 52' which are respective reflected lights of the sub-beams 51 and 52 on both sides are radiated, respectively, to the photodetectors 12gc and 12gd.

Figure 8:
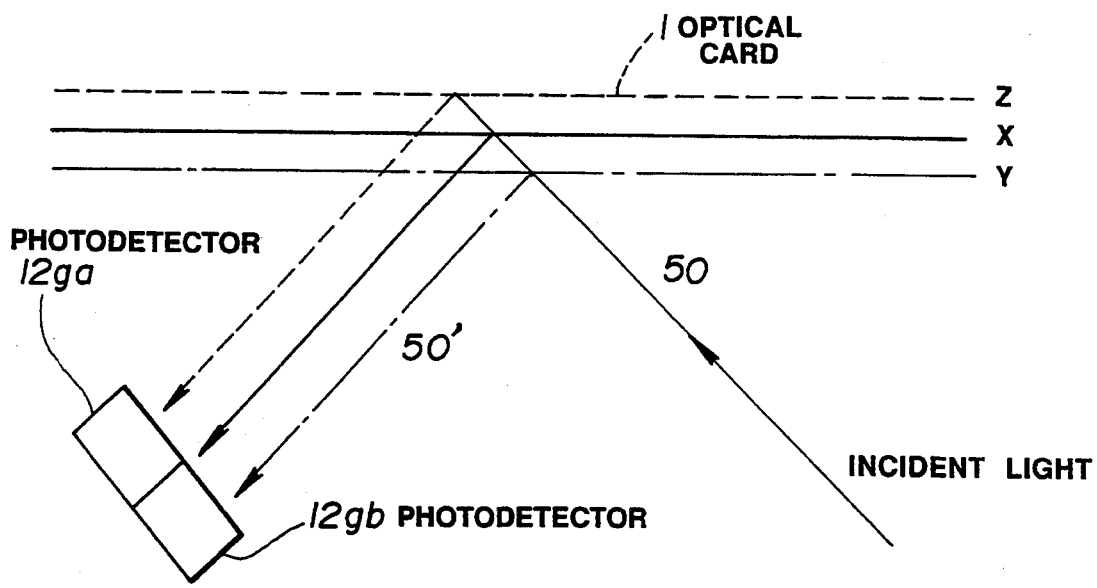

Here, the relations of the optical card 1 with the incident light, reflected light and photodetector 12g are as shown in FIG. 8. When the signal recording surface of the optical card 1 is in focus X, the reflected light will be radiated to the boundary of the two photodetectors 12ga and 12gb and therefore the difference between the outputs of the photodetectors 12ga and 12gb will be zero. On the other hand, when the signal recording surface of the optical card 1 is displaced to the position Y, the output of the photodetector 12ga will become smaller than the output of the photodetector 12b. On the contrary, when the signal recording surface of the optical card 1 is displaced to the position Z, the output of the photodetector 12ga will become larger than the output of the photodetector 12gb in the obtained signal.

In other words, when the distance between the optical card 1 and objective lens 12d becomes small and large, the main beam 50' will be displaced in the arrow F direction on the photodetector 12g in FIG. 7 and the output values of the photodetectors 12a and 12b will become different depending on the displacement. Here, as the center position of the main beam 50' when in focus is adjusted to be on the border line between the photodetectors 12ga and 12gb, when the difference between the output values of the photodetectors 12ga and 12gb is detected, a focus error signal will be obtained.

On the other hand, the same as in the focus error signal, a tracking error signal is determined by detecting the difference between the outputs of the photodetectors 12gc and 12gd. When the objective lens 12d is driven so that such output difference may be always zero, the main beam 50 will always follow in focus the information track provided on the track 2.

The output (added sum of the outputs of the photodetectors 12ga and 12gb) of the above mentioned photodetector 12g is fed to the demodulating circuit 17, as shown in FIG. 4, and a reading signal is produced by this demodulating circuit 17. The output of the above mentioned photodetector 12g (such as its photodetectors 12ga and 12gb) is fed also to the focus & track servo circuit 15.

This focus & track servo circuit 15 produces a focus error signal and tracking error signal by the subtraction from the output of the photodetector 12g. These signals are further compensated in phase and amplified to be a focus driving signal FD and tracking driving signal TD and are then applied to the lens actuator 12h driving the objective lens 12d. The objective lens 12d is driven in the focusing and tracking direction through this lens actuator 12h so that a spot formed on the track of the optical card 1 may always follow the track as in focus.

The tracking driving signal TD is applied to the lens actuator 12h through the switch SW which is controlled to be on/off by the controller 31 and will be on in the tracking servo state but will be off in the case of the access operation of moving the optical head 12 in the track crossing direction B.

When data are to be reproduced, the controller 31 will have a low output reading light beam output from the laser diode 12a through the laser driving circuit 16 and will control the drive of the motor servo circuit 13, optical head driving circuit 14, focus & track servo circuit 15 and demodulating circuit 17 to gain access to a desired target track of the optical card by the track address information demodulated by the demodulating circuit 17 and having had errors corrected by the error detecting & correcting circuit 18. That is, after the above mentioned coarse access operation, the switch SW is switched on to set the tracking state of the optical beam following the nearest track, the optical card 1 is conveyed to input the reflected light from the ID parts 4A and 4B into the demodulating circuit 17 and error detecting & correcting circuit 18 through the photodetector 12g and it is judged whether or not the demodulated and error corrected track address information coincides with the track address information of the target track so as to be able to gain access to the target track.

In case access is gained to the target track, when the data are to be reproduced, the controller 31 will control the data of the data part 5 adjacent to the ID part 4A or 4B to be demodulated by the demodulating circuit 17 and have errors corrected by the error detecting & correcting circuit 18 so as to be reproduced.

Also, when the data are to be recorded, the same as when the data are to be reproduced on the target track on which the data are recorded in the optical card 1, after the same control of access, after the access control ends, the controller 31 will output a high output recording light beam from the laser diode 12a through the laser driving circuit 16. This recording light beam is modulated by the data after the data to be recorded are encoded by the data encoding circuit 20 and a high output pulse-like driving current and a low output pulse-like driving current are fed to the laser diode 12a.

In this case, when the high output pulse-like driving current is fed to the laser diode 12a, this laser diode 12a will become a high output light beam and a pit will be formed in the track part to which this high output light beam is radiated, that is, any data will be recorded in the data part 5. By the way, the details at the time of recording data shall be described later.

The controller 31 not only controls the motor servo circuit 13 and optical head driving circuit 14 but also monitors abnormal state detecting signals from the respective circuits.

For example, a relative moving speed abnormal signal 40 showing that the fluctuation of the relative moving speed in the track direction of the optical card 1 and optical head 12 has become above the prescribed value from the motor servo circuit 13, an optical head drive abnormal signal 41 showing that the optical head 12 has exceeded the normal driving range due to some cause from the optical head driving circuit 14, a laser diode deterioration signal 42 showing the deterioration of the laser diode 12a and laser diode abnormal signal 43 showing an abnormal light emission from the laser driving circuit, a focus & track abnormal signal 44 showing that the incident light has become unable to follow in focus the track of the optical card from the focus & track servo circuit 15, and an error correction abnormal signal 45 showing that errors in the read out data can not be corrected from the error detecting & correcting circuit 18 are input into the controller 31.

When these abnormal signals are detected, the controller 31 will process the errors in response to the respective abnormal states.

The details of the operation of the optical card recording/reproducing apparatus at the time of recording data shall now be explained. The first embodiment is an example of the case of recording data for one track.

Figure 5:
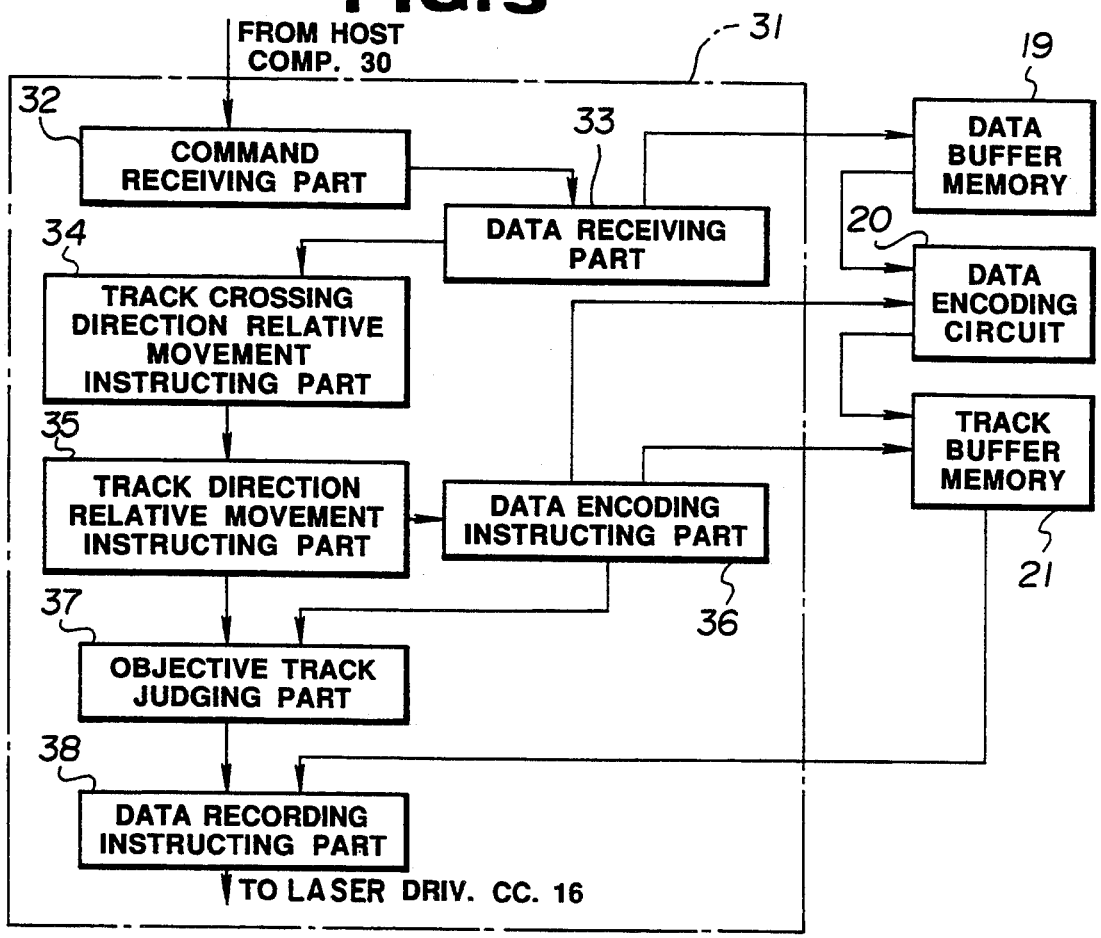
FIGS. 4 to 10 relate to the first embodiment of the present invention.
Figure 2:
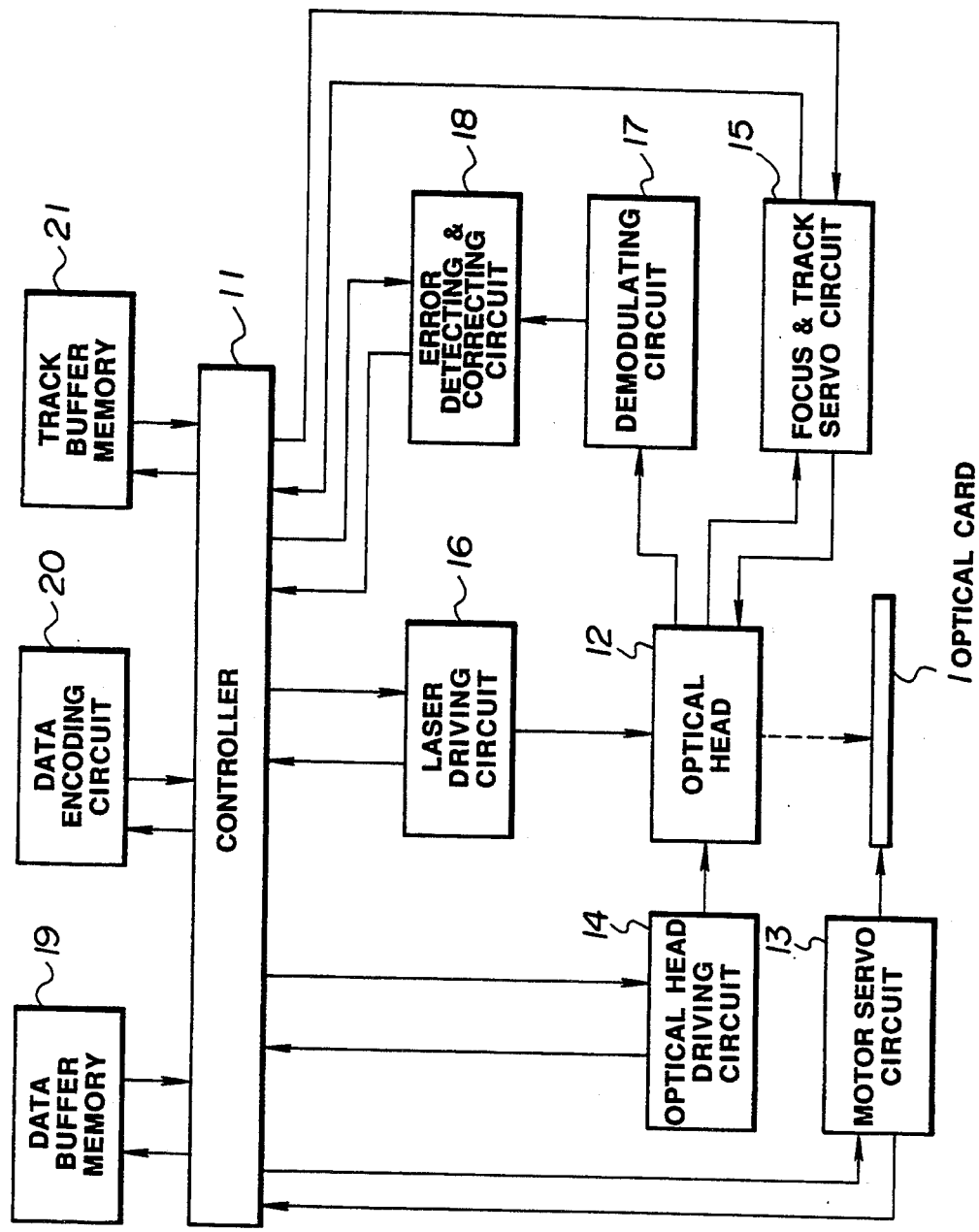
FIG. 2 is a block diagram showing a schematic formation of an optical card recording/reproducing apparatus of the prior art example.
Figure 3:
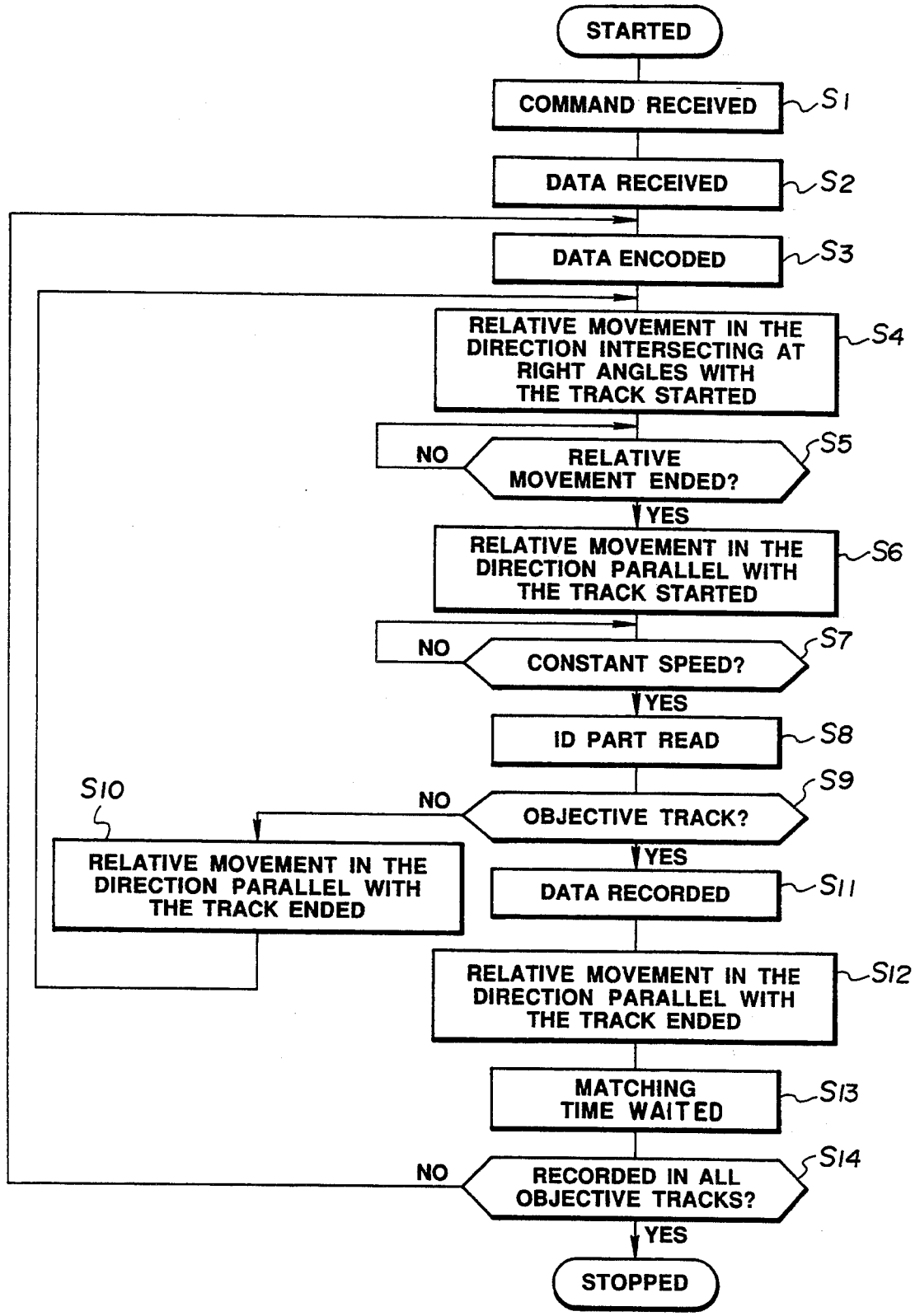
FIG. 3 is a flow chart showing the operation at the time of recording data of the optical card recording/reproducing apparatus of the prior art example.

At the time of recording data, the controller 31 will be of such functional formation as is shown in FIG. 5. The respective parts operate the respective functions as shown by the solid lines. A command to record data is received from the host computer 30 by the command receiving part 32. The data to be recorded are received by the data receiving part 33 and are temporarily memorized in the data buffer memory 19. The optical head 12 is relatively moved in the direction crossing the track of the optical card 1 by the track crossing direction relatively moving instructing part 34.

Then, relatively moving the optical card 1 in the direction parallel with the track with respect to the optical head 12 by the track direction relatively moving instructing part 35, encoding the data is instructed by the data encoding instructing part 36, the data temporarily memorized in the data buffer memory 19 are encoded by the data encoding circuit 20 and the encoded data are temporarily memorized in the track buffer memory 21. Then, it is judged by the objective track judging part 37 whether or not it is the objective track (target track). In case it is the objective track, a data recording instruction will be made by the data recording instructing part 38 and the data temporarily memorized in the track buffer memory 21 will be modulated and will be recorded in the optical card 1.

A track crossing direction relative moving means is formed from the above mentioned track crossing direction relative movement instructing part 34, optical head driving circuit 14, motor 27 and rotary encoder 28, a track direction relative moving means is formed of the above mentioned track direction relative movement instructing part 35, motor servo circuit 13, motor 25 and rotary encoder 26 and an access means is formed of these track crossing direction relative moving means and track direction relative moving means.

Also, a data encoding means is formed of the above mentioned data encoding instructing part 36 and data encoding circuit 20.

Figure 9:
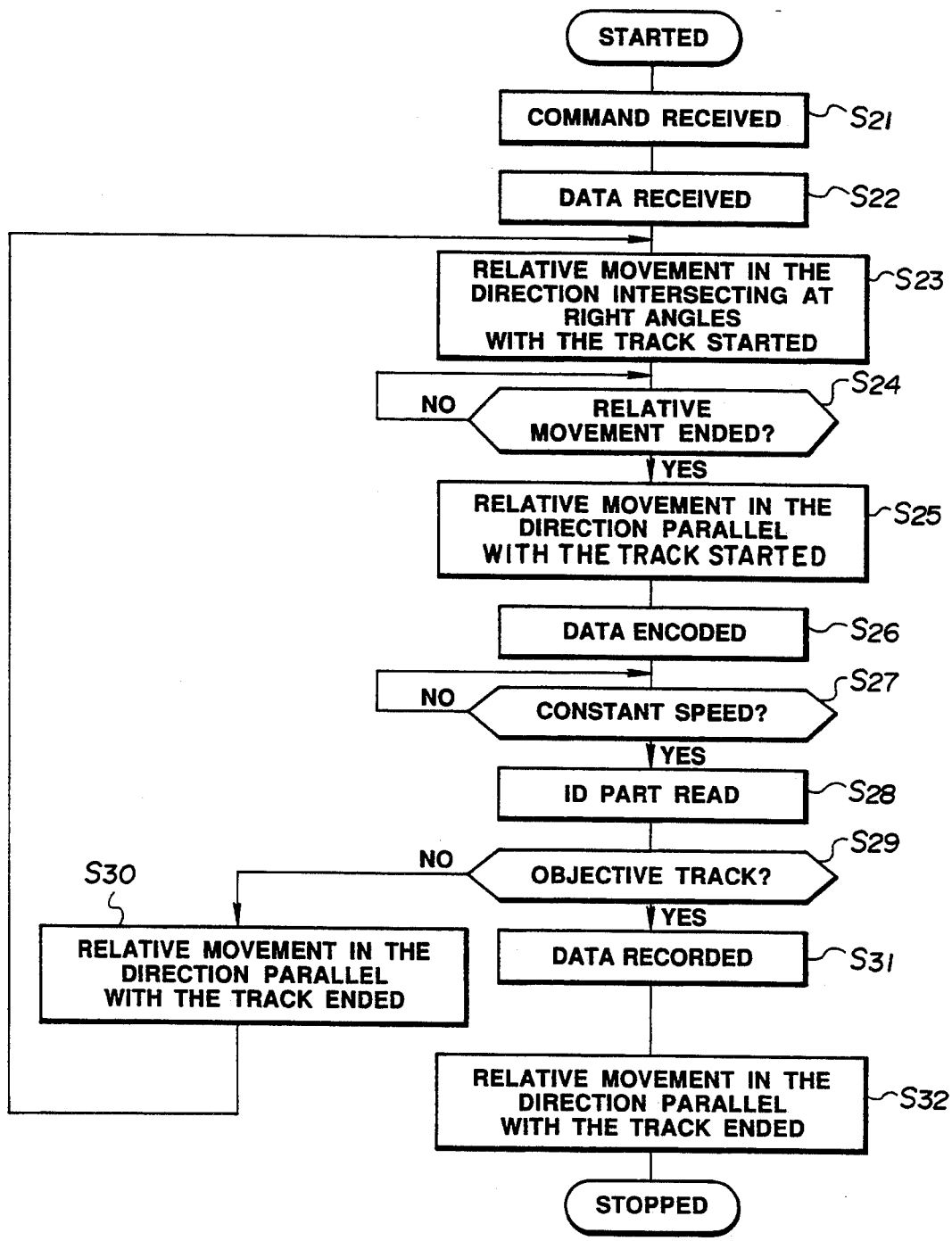

The operation of the optical card recording/reproducing at the time of recording data based on the functional formation of the above mentioned controller 31 is shown in the flow chart in FIG. 9.

First of all, in the step S21, the controller 31 receives a command from the above mentioned host computer 30 and it is interpreted to be a command to record data. Then, in the step S22, the data for one track to be recorded are received from the host computer and are temporarily memorized in the data buffer memory 19.

Then, in the step S23, the controller 31 calculates the moving amount of the optical head 12 from the track number in which the optical head is now positioned and the target track number to be recorded transmitted together with the above mentioned command from the host computer and instructs the optical head driving circuit 14 to relatively move the optical head 12 in the direction intersecting at right angles with the track. In the case of this relative movement, the switch SW is set off. Then, in the step S24, during this relative movement, the output pulses of the rotary encoder 28 are counted with a counter or the like, it is judged whether the counted value has reached the moving amount to be moved or not and it is thereby judged whether the relative movement is ended or not.

Then, in the step S25, the motor servo circuit 13 is instructed to relatively move the optical card 1 so that the optical head 12 may relative move in a relatively parallel direction with the track of the optical card 1. In the case of this relative movement, the switch SW is set on to hold the tracking servo state of the light beam following the nearest track. Just after this relative movement is started, in the step S26, the controller 31 reads data out of the data buffer memory 19, the data are encoded by adding error detecting and correcting redundant data by using the data encoding circuit 20 for these data and these encoded data are temporarily memorized in the track buffer memory 21.

Then, in the step S27, the controller 31 monitors the signals from the motor servo circuit 13 and judges whether or not the relative moving speed of the optical head 12 and optical card 1 is constant. In the step S28, the ID part 4A in such optical card 1 as is shown in FIG. 1 is read out by using the demodulating circuit 17 and error detecting & correcting circuit 18. In the step S29, the track number of the above mentioned read out ID part 4A and the track number of the object to be recorded are compared with each other. In case they are different, the process will proceed to the step S30 in which the motor servo circuit 13 is instructed to stop the relative movement of the optical head 12 and optical card 1. The operations of the steps S23 to S29 are repeated again. However, after the second time, the data encoding operation in the step S26 need not be made.

In case the track number of the ID part 4A coincides with the track number of the object to be recorded, the process in will proceed to the step S31 in which the controller 31 controls so that the above mentioned encoded data to be recorded may be read out of the track buffer memory 21, a high output recording light beam may be modulated in response to the above mentioned data and may be output from the laser diode 12a and desired data may be recorded in the above mentioned objective track. When the recording of the data in the data part of the target track ends, in the step S32, the motor servo circuit 13 is instructed to stop the relative movement of the optical head 12 and optical card 1 to end the recording of the data.

Here, when the optical head 12 is relatively moved in the direction parallel with the track of the optical card 1, the relation of the time and speed from the start to the end of the relative movement will be as shown in FIG.

Figure 10:
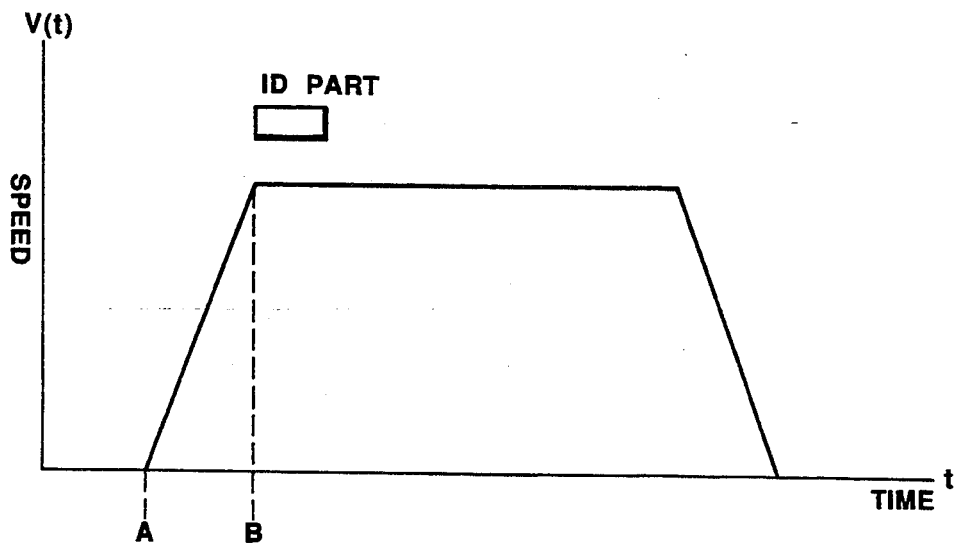

10. The time (between A and B in FIG. 10) taken after the relative movement is started until the speed becomes constant and the ID part 4A is read out is about 20 to 30 ms. On the other hand, in the step S26, the time for encoding the data is about 1 to 3 ms (for example, about 3 ms if the data for one track consist of 1024 bytes) and therefore the data of S26 can be well encoded between A and B. Therefore, the data encoding operation and the operation of starting the relative movement in the direction parallel with the track of the optical card 1 of the optical head 12 can be in parallel made and the time between the moment the data recording command is received until the moment the recording in the medium is started can be made short. Therefore, the time for recording data can be made short.

Figure 11:
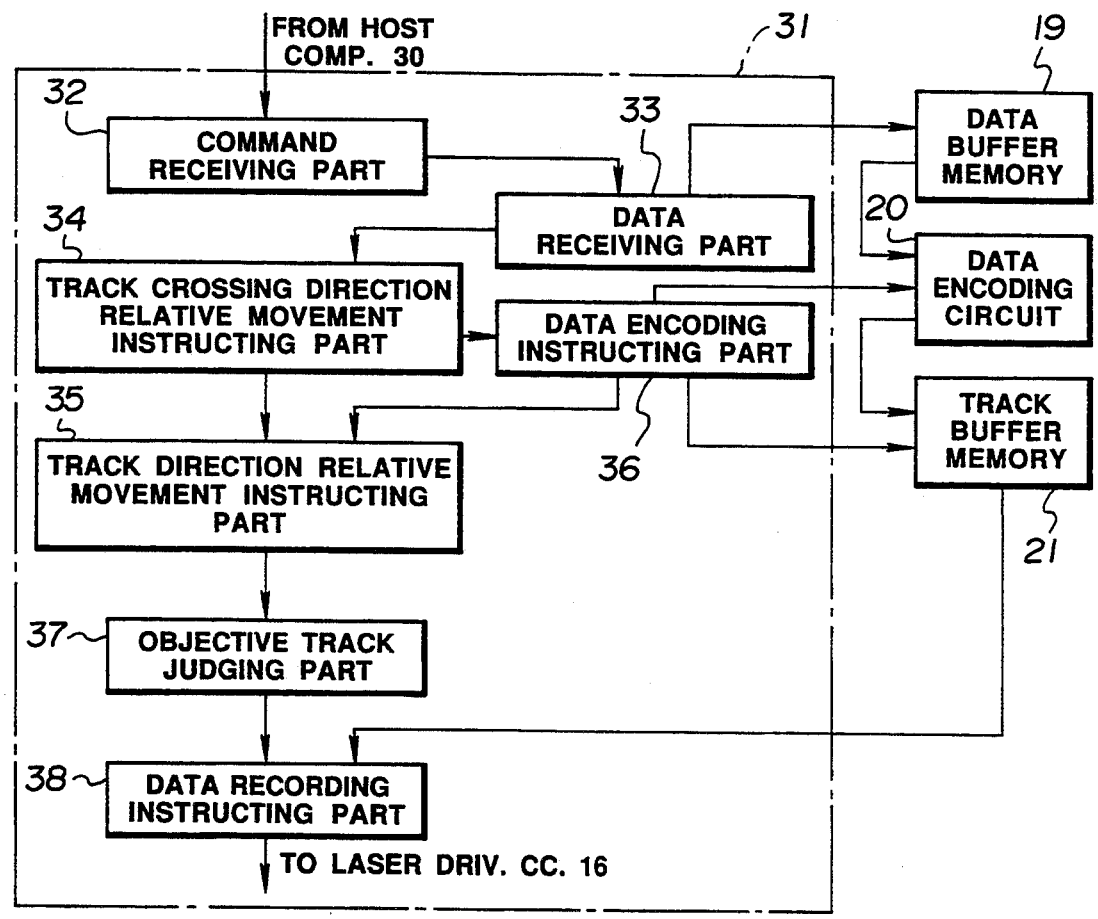
FIG. 11 is a functional block diagram at the time of recording data of a controller in the second embodiment of the present invention.

FIG. 11 shows a functional formation of the controller 31 in the optical card recording/reproducing apparatus of the second embodiment of the present invention. In this embodiment, in FIG. 5, the operation of the data encoding instructing part 36 is made parallel with the relative moving operation in the track crossing direction by the track crossing direction relative movement instructing part 34. The others are the same as in the first embodiment.

Figure 12:
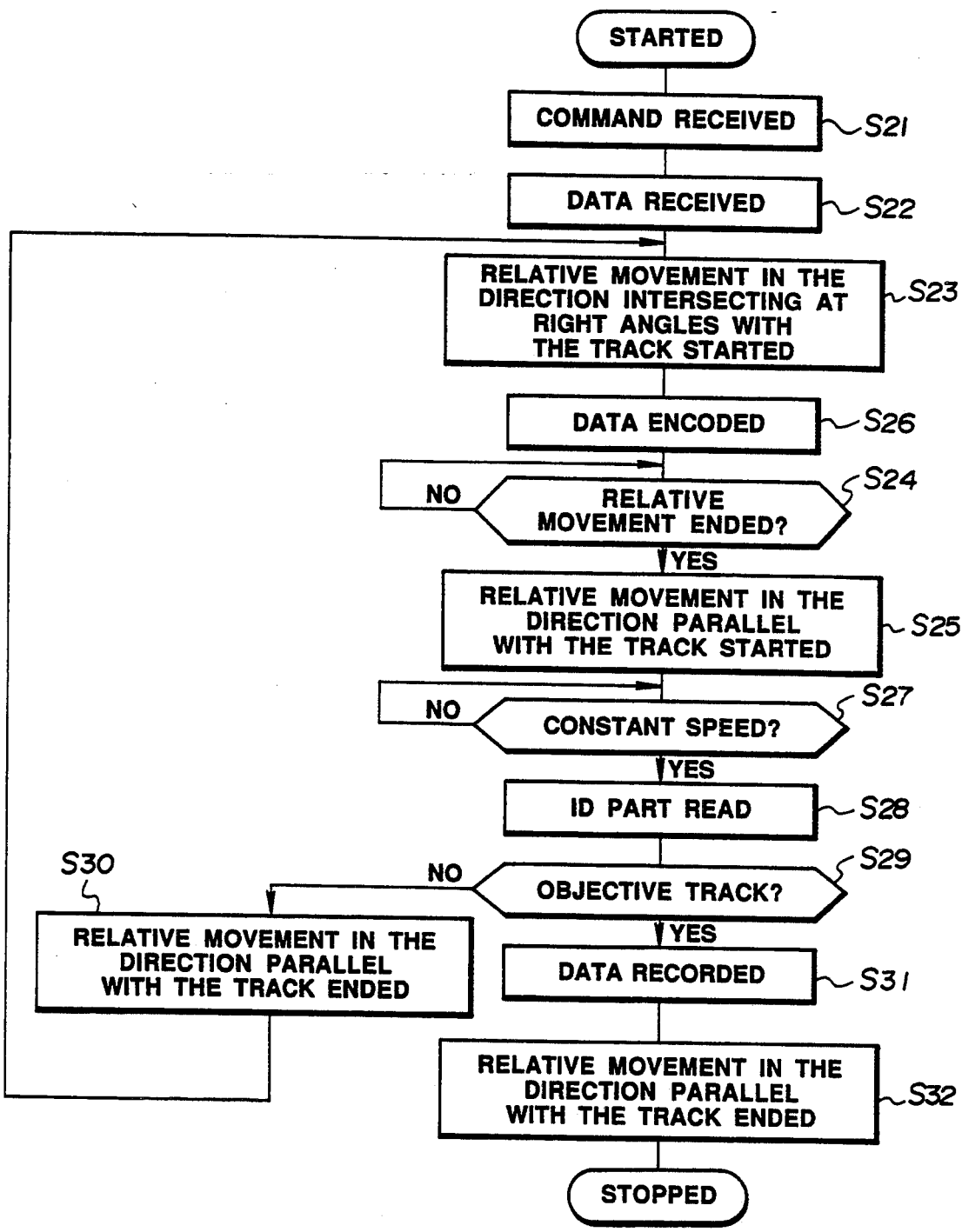
FIG. 12 is a flow chart showing the operation at the time of recording data in the second embodiment.

FIG. 12 is a flow chart showing the operation at the time of recording data of this embodiment.

As shown in FIG. 12, in the second embodiment, in the step S23, the controller 31 instructs the optical head driving circuit 14 to relatively move the optical head 12 in the direction intersecting at right angles with the track of the optical card 1. Just after this relative movement is started, the step S26 is made. The controller 31 reads data out of the data buffer memory 19 and to these data are added redundant data for detecting and correcting errors by using the data encoding circuit 20 to encode the data. These encoded data are temporarily memorized in the track buffer memory 21. The other formations and operations are the same as in the first embodiment.

Here the time taken to relatively move the optical head 12 in the direction intersecting at right angles with the track of the optical card 1 in the step S23 is about 5 ms at the minimum (in the case of moving it to the adjacent track). On the other hand, the time taken to encode the data in the step S26 is about 1 to 3 ms as described above. Therefore, the data can be well encoded in the step S26 in the period while the optical head 12 is being relatively moved in the direction intersecting at right angles with the track of the optical card 1.

Therefore, the data encoding operation and the operation of relatively moving the optical head in the direction intersecting at right angles with the track can be parallelly made and the time taken after the data recording command is received until the recording in the medium is started can be made short. Therefore, the time in recording data can be made short.

FIG. 13 is a flow chart showing the operation at the time of recording data in the third embodiment of the present invention.

As shown in FIG. 13, in the third embodiment, in the step S29, the track number of the ID part 4A read out after the relative movement and the track number of the object to be recorded are compared with each other. Just after they are judged to coincide with each other, the controller 31 reads data out of the data buffer memory 19. These data are encoded by adding error detecting and correcting redundant data by using the data encoding circuit 20 and the encoded data are temporarily memorized in the track buffer memory 21. The other formations and operations are the same as in the first embodiment.

It takes generally several ms after it is started to scan the ID 4A until the data are recorded in the data part 5. Therefore, in this embodiment, this time is utilized to encode the data. That is to say, even between the steps S29 and S31, the data encoding operation in the step S26 is made. Therefore, the data encoding operation is made after the optical head 12 is judged to have reached the objective track to be recorded until an instruction to start recording data is made so that the time after a command to record data is received until the recording in the medium is started may be reduced. That is to say, the time for recording data can be made short.

By the way, in the first to third embodiments, after the start of the relative movement of the optical head 12 in the direction intersecting at right angles with the track in the step S23 until the instruction to start recording data in the step S31, the data encoding operation may be started and ended anywhere.

FIG. 14 shows a functional formation of the controller 31 in the fourth embodiment of the present invention. This embodiment is of the case of recording data in a plurality of tracks. After data are received in the data receiving part 32, the data encoding instructing part 36 instructs to encode the data to be recorded in the first objective track. After recording in the first objective track, during access to the next objective track, encoding the data to be recorded in the next objective track is instructed.

Figure 15:
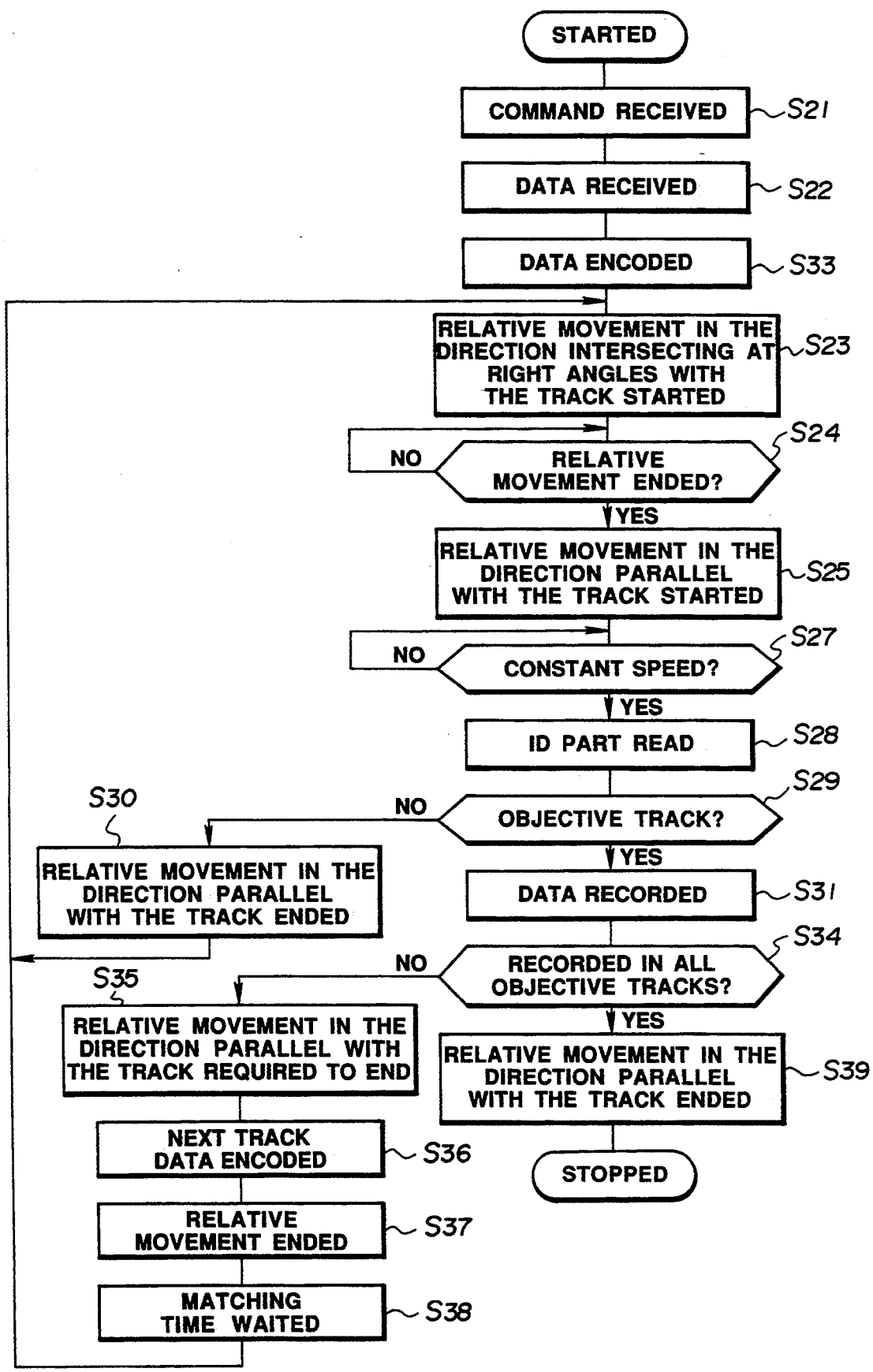
FIG. 15 is a flow chart showing the operation at the time of recording data in the fourth embodiment.

FIG. 15 is a flow chart showing the operation at the time of recording data in this embodiment.

First of all, in the step S21, the controller 31 receives a command from the above mentioned host computer and, if it is interpreted to be a command to record data, then in the step S22, the data to be recorded are received from the host computer and are temporarily memorized in the data buffer memory 19. Then, in the step S33, for example, the data for one track are read out of the data buffer memory 19 and are encoded by adding error detecting and correcting redundant data by using the data encoding circuit 20 and these encoded data are temporarily memorized in the track buffer memory 21. Then, in the step S23, the controller 31 calculates the moving amount of the optical head 12 from the track number in which the optical head 12 is now positioned and the track number of the object to be recorded transmitted together with the above mentioned command from the host computer and instructs the optical head driving circuit 14 to relatively move the optical head 12 in the direction intersecting at right angles with the track of the optical card 1. In the step S24, it is judged whether the above mentioned relative movement has ended or not.

Then, in the step S25, the motor servo circuit 13 is instructed to relatively move the optical card 1 so that the optical head 12 may relatively move in the direction parallel with the track of the optical card 1. Then, in the step S27, the controller 31 monitors the signals from the motor servo circuit 13 and judges whether the relative moving speed of the optical head 12 and optical card 1 is constant or not. In the step S28, the ID part 4A of the optical card is read out by using the demodulating circuit 17 and error detecting & correcting circuit 18. Then, in the step S29, the track number of the above mentioned read out ID part 4A and the track number of the object to be recorded are compared with each other and, in case they are different from each other, the process will proceed to the step S30 in which the motor servo circuit 13 is instructed to stop the relative movement of the optical head 12 and optical card 1. The operations of the steps S23 to S29 are repeated again.

In case the track number of the ID part 4A coincides with the track number of the object to be recorded, the process will proceed to the step S31 in which the above mentioned encoded data to be recorded are read out of the track buffer memory 21, a high output recording beam is modulated in response to the above mentioned data and is output from the laser diode 12a and desired data are controlled to be recorded in the above mentioned objective track. In the step S34, it is confirmed whether the data have been recorded in all the objective tracks required from the host computer. Here, if the data have been recorded in all the objective tracks, the process will proceed to the step S39 in which the motor servo circuit 13 is instructed to stop the relative movement of the optical head 12 and optical card 1 and the recording of the data all ends.

If the recording in all the objective tracks is not yet completed, the process will proceed to the step S35 in which it is instructed to require to end the relative movement of the optical head 12 and optical card 1. Just after it is instructed to require to end the relative movement, in the step S36, the controller 31 reads the data to be recorded in the next track out of the data buffer memory 19, encodes these data by adding error detecting and correcting redundant data by using the data encoding circuit 20 and temporarily memorizes the encoded data in the track buffer memory 21. Then, in the step S37, the above mentioned relative movement is waited to end and further, in the step S38, the shuttle 24 charged with the optical card 1 is waited for a fixed matching time to completely stop. Thereafter, the operations in the steps S23 to S38 are repeated by the required number of tracks to all end the recording of the data. The other formations and the like are the same as in the first embodiment.

Here, when the optical head 12 is relatively moved in the direction parallel with the track of the optical card 1, the relation between the time and speed from the start to end of the relative movement will be as shown in FIG. 16. The time taken (between A and B in FIG. 16) after it is instructed to require the relative movement to end until the relative movement ends is about 20 to 30 ms. On the other hand, the time taken to encode data in the step S36 is about 1 to 3 ms (about 3 ms, if the data, for example, for one track are 1024 bytes). Therefore, between A and B, the data encoding operation in the step S36 can be well made. Therefore, the operation of encoding the data to be recorded in the next track and the operation of ending the relative movement of the optical head 12 in the direction parallel with the track can be made in parallel, the time after a command to record data is received until recording in the medium is started can be made short and therefore the time for recording data can be reduced.

FIG. 17 relates to the fifth embodiment of the present invention and is a flow chart showing the operation at the time of recording data of an optical card recording-/reproducing apparatus.

As shown in FIG. 17, in the fifth embodiment, in the step S31, data for one track are recorded and then, in the step S40, it is instructed to require to end the relative movement of the optical head 12 and optical card 1. After it is instructed to require to end the relative movement, in the step S41, it is confirmed whether data have been recorded in all the objective tracks required from the host computer or not. Here, if the data have been recorded in all the objective tracks, the process will proceed to the step S44 in which the motor servo circuit 13 is instructed to stop the relative movement of the optical head 12 and optical card 1 and the data recording all ends.

If the recording has not yet been completed in all the objective tracks, the process will proceed to the step S42 in which the above mentioned relative movement is waited to end. Further, in the step S43, the shuttle 24 charged with the optical card 1 is waited for a fixed matching time to completely stop, while the controller 31 reads the data to be recorded in the next track out of the data buffer memory 19, encodes these data by adding error detecting and correcting redundant data by using the data encoding circuit 20 and temporarily memorizes the encoded data in the track buffer memory 21. Thereafter, the operations in the steps S23 to S43 are repeated for the number of the required tracks to all end the recording of the data. The other formations and operations are the same as in the fourth embodiment.

Here, the fixed matching time required between B and C in FIG. 16, that is, after the relative movement ends in the controller 31 until the shuttle 24 mechanically charged with the optical card 1 completely stops is about 10 to 15 ms. On the other hand, the time for encoding the data is about 1 to 3 ms (about 3 ms, for example, if the data for one track are 1024 bytes). Therefore, between B and C, the data encoding operation can be well made. Therefore, the operation of encoding the data to be recorded in the next track and the operation of waiting for a fixed time to completely stop the shuttle 24 charged with the optical card 1 can be made in parallel, the time after a command to record data is received until recording in the medium is started can be made short and therefore the time for recording data can be reduced.

By the way, in the fourth and fifth embodiments, anywhere in the steps S23 to S34, that is, during the time after the optical head 12 starts the relative movement in the direction intersecting at right angles with the track until the data for one track are recorded and it is confirmed whether the recording in all the objective tracks has been completed or not, the data to be recorded in the next track can be also encoded.

As another embodiment or modification, in recording data in a plurality of tracks, the operation of encoding the data to be recorded in the first track is not made in series as in the step S33 in FIG. 15 of the fourth embodiment but the data can be encoded after the optical head starts a relative movement in the direction parallel with the track, for example, as in the step S26 in FIG. 9 of the first embodiment. That is to say, in this modification, the step S33 of the operation of encoding the data to be recorded in the first step in the fourth or fifth embodiment is combined with any of the first to third embodiments so as to be made in parallel with the operation of the relative movement or the like.

In this case, too, the same as in the first embodiment, the operation of encoding data can be made in parallel with the operation of the relative movement or the like and, in the case of recording data in a plurality of tracks, the operation of encoding all the data to be recorded can be made in parallel during the process after a command to record data is received until the data are recorded in the medium. Therefore, the time after a command to record data is received until recording in the medium is started can be made short and the time to record data can be reduced.

The above described embodiments have been explained on the data encoding operation but this invention can be applied also to the operation of correcting errors at the time of the reproduction.

FIG. 18 shows a functional formation of the controller 31 in the sixth embodiment of the present invention. In this embodiment, in FIG. 5, the output of the command receiving part 32 is input into the track crossing direction relative movement instructing part 34. Also, with the output of the objective track judging part 37, the data reproduction instructing part 61 instructs the demodulating circuit 17 to demodulate data. The data demodulated by this demodulating circuit 17 are temporarily stored in the track buffer memory 19.

After this demodulating circuit 17 demodulates data for one track, for example, with the output (which may be of the rotary encoder 26) of the demodulating circuit 17, the error correcting instructing part 62 instructs the error detecting & correcting circuit 18 to correct errors. The error detecting & correcting circuit 18 is read out and makes an error detecting & correcting process on the data stored in the track buffer memory 21. The data having had errors corrected are stored in the data buffer memory 19. The data stored in the data buffer memory 19 are transferred to the host computer 30 through the data transmitting part 63.

FIG. 19 is a flow chart showing the operation at the time of reproducing data in the sixth embodiment and is similar to the flow shown in FIG. 15. In the step S21, when a command to reproduce data is received by the command receiving part 32 from the host computer 30, a track crossing movement (coarse access) toward the objective track in the step S23 will start. Thereafter, the same as in the flow shown in FIG. 15, the steps S24, S25, S27 to S30 are made. In the step S29, in case track is judged to be the objective track, in the step S31', the data for one track are reproduced. In this step S31', after the data are reproduced, in the step S34', it is judged whether the data have been reproduced in all the tracks instructed to be read out or not.

In this case, as the data are to be reproduced in the first objective track, the process moves to the step S35. While the steps S37 and S38 after this step S35 are being made, in this embodiment, the error correcting process for the data of the above mentioned objective track read out is made in parallel. After the step S38, the process returns to the operation of access to the next objective track, that is, to the step S23 and the optical head 12 is moved in the track crossing direction toward the next objective track.

In this embodiment, for the data read out of the objective track to which access is gained, the error correcting process is made while access is gained to the next objective track. In case the data reproduction in all the objective tracks thus ends, as shown in the step S45, the error correcting process for the objective track read out last will be started and the process of the step S39 will be made. After the step S45, in the step S46, a data transferring process of transferring the data having had the errors corrected to the host computer 30 is made to end the process of reproducing data.

In the fifth embodiment, the error encoding process is made in parallel during the access to the next objective track but, in the present embodiment, the error correcting process is made in parallel during the access to the next objective track and therefore the data reproducing time until the data having had the errors corrected are obtained from all the objective tracks can be made short.

FIG. 20 shows a part of the flow in the first modification of the sixth embodiment. In this modification, in FIG. 19, after the step S36', the data process of transferring the data having had the errors corrected to the host computer 30 shown in the step S46 is made in parallel. The others are the same as in FIG. 19. In the case of this modification, the data transfer of the step S46 in FIG. 19 will be only of the last one track.

According to this modification, the data reproducing time until the data having had the errors corrected are obtained from all the objective tracks can be made short and the time from the start of the data reproduction to the reproduced data transfer to the host computer can be reduced.

FIG. 21 shows a part of the flow in the second modification of the sixth embodiment. In this modification, in FIG. 19, the error correction for the read out data is made after the step S37 of the relative movement end and the process of the error correction on the read out data is made while the matching time is waited as in the step S38'. The others and effects are the same as in the sixth embodiment.

By the way, at the time of reproducing data, even in others than such error correcting process as is shown in FIGS. 19 to 21, the errors can be corrected. For example, the step S36' in FIG. 19 may be carried out while the step S23 (in the case of moving to the next objective track) or S25 is made.

Also, encoding or recording data is not limited to be in a unit of one track but may be, for example, in a sector unit or a block unit of a plurality of tracks, if in encoding data. In the case of reproduction, the same will also apply.

As explained above, according to the first to sixth embodiments, there is an effect that, in the operation after a command to record or reproduce data is received until the data are recorded or reproduced in the medium, when encoding data or correcting errors is made in parallel with the access operation, the time for recording/reproducing data can be reduced.

The optical card recording/reproducing apparatus wherein the error correction and data transfer of the information read out of the optical card can be efficiently made and the access time to the host computer can be made short shall be explained in the following.

The optical card 1 used in the seventh embodiment is the one shown in FIG. 1. The track 2 of this optical card 1 is shown in FIG. 22 as magnified.

As shown in FIG. 22, the optical card 1 has track guides 119 and 120 to be guides for tracking, is provided between the track guides 119 and 120 with the above mentioned ID parts 4A and 4B and further has between the ID parts 4A and 4B the above mentioned data part 5 interposed between gaps 121 and 122. Sector data are to be recorded in the data part 5. The gaps 121 and 122 have a role of absorbing the speed fluctuation in the case of driving the optical card 1 at a constant speed. The length of the ID parts 4A and 4B is set to be, for example, 3 mm, and the length of the gaps 121 and 122 is set to be, for example, about 1 to 2 mm.

FIG. 23 shows the formation of the driving part 81a of the optical card apparatus. In this apparatus, the optical card 1 in FIG. 1 is moved in the track direction and the optical head 12 shown in FIG. 4 is moved in the direction intersecting at right angles with the track to record/reproduce data. The means for moving the optical card 1 in the track direction is formed, for example, of the conveyer belt 23 shown in FIG. 4 or the like. When the optical card 1 is reciprocatively conveyed on the above mentioned conveyer belt 23, the above mentioned optical head 12 will be able to be set relatively in the position opposed to any position in the track direction of the optical card 1.

Also, the above mentioned optical head 12 is moved in the direction intersecting at right angles with the track of the optical card by the drive of the head driving motor 27 in FIG. 4. A photodetector 12g is provided within the optical head 12 so that a tracking servo control made to follow a predetermined track, for example, by a 3-beam method or the like by the signal from this photodetector 12g may be made and a focus servo control focusing a light beam on the optical card 1 may be also made.

The driving part 81a located within the above mentioned optical card apparatus and controlling the operation of reading out/writing in recorded data of the optical card 1 comprises a demodulating circuit 82 demodulating, for example, by a byte unit the recorded data of the optical card 1 detected by the above mentioned photodetector 12a, a first buffer part 83 temporarily memorizing the recorded data demodulated by the demodulating circuit 82, an EDAC circuit correcting errors of the recorded data stored in the first buffer part 83, a second buffer part 85 temporarily memorizing the recorded data having had the errors corrected by the EDAC circuit 84, a direct memory access (abbreviated as DMA hereinafter) circuit 86 for transferring the recorded data stored in the second buffer part 85 to the external host computer 30 and such CPU 87 as a microcomputer controlling the operation of the whole driving part 81a.

By the way, the EDAC circuit 84 corrects errors on hardware to enable a high speed process. Generally, in case errors are corrected on hardware, the time required to correct errors will be several ms or 20 ms at the maximum. That is to say, the error correcting time of the EDAC circuit 84 is 20 ms at the maximum. Also, such interface as, for example, an SCSI is interposed between the EDAC circuit and host computer 30.

Though different with the format, the recorded data of one sector of the optical card 1 are about 1024 bytes at the maximum in one track and one sector. Therefore, in the IDAC circuit 84, for example, the transfer rate of the SCSI is 200 to 300K bytes/second and therefore 1024 bytes can be transferred, for example, in about 5 ms even through the SCSI.

The above mentioned CPU 87 is to instruct the demodulating circuit 82 to read out the recorded data and is to receive a signal of the completion of the reading out of the demodulating circuit 82. The CPU 87 is also to instruct the EDAC circuit 84 to correct errors, is to receive an error correct,on completion signal of the EDAC circuit 84, is further to instruct the DMA circuit 86 to transfer data and is to receive a data transfer completion signal of the DMA circuit 86.

The data transferring operation in this embodiment shall be explained with reference to FIG. 24. By the way, FIG. 24a shows the relation between the moving speed and time t of the optical card 1 and an example of the case that the card 1 is accelerated to a constant speed driving state and is then decelerated.

When a signal requiring the transfer of the recorded data from the host computer 30 shown in FIG. 24b is input, the CPU 87 of the driving part 81a will make the optical head seek the objective track to be read out and will then set the optical card 1 in a constant speed driving state as shown in FIG. 24a and the above mentioned photodetector will read out the data of the optical card 1. As synchronized with a signal instructing to read out the data from the CPU 87, the demodulating circuit 81 demodulates the data read out of the above mentioned photodetector to data of a byte unit.

The first buffer part 83 sequentially writes in the data demodulated by the demodulating circuit 82. When the data for one sector are read out, the demodulating circuit 82 will output the reading completion signal shown in FIG. 24c to the CPU 87.

As synchronized with the reading completion signal, the CPU 87 outputs the error correction starting signal shown in FIG. 24d to instruct the EDAC circuit 84 to start correcting errors. The EDAC circuit 84 corrects errors on the data written into the first buffer part 83. The required time is within 20 ms at most as described above. The data having had the errors corrected by the EDAC circuit 84 are sequentially written into the second buffer part 85. On the other hand, when the error correction of all the data within the first buffer part 83 is completed, the EDAC circuit 84 will output the error correction completion signal shown in FIG. 23e to the CPU 87.

At this time point, in case the transfer requiring signal from the host computer 30 is being continuously input into the CPU 87, the CPU 87 will be synchronized with the error correction completion signal of the EDAC circuit 84 and will output to the DMA circuit 86 the data transfer starting signal shown in FIG. 24f. As synchronized with the data transfer starting signal of the CPU 87, the DMA circuit 86 sequentially transfers the recorded data written into the second buffer part 85 and having had errors completely corrected to the host computer 30 through the above mentioned interface, for example, an SCSI interface. At this time, the time required to transfer the data is, for example, about 5 ms as described above. Therefore, the time required from the completion of reading out the data recorded in the data part of the optical card 1 to the transfer of the data to the host computer is, for example, 25 ms at the maximum. By the way, the host computer 30 is synchronized with the data transfer starting signal and tails the transfer requiring signal.

On the other hand, the speed in the constant speed driving state of the optical card 1 is usually within 640 mm/s at most. In case the optical card 1 moves in the constant speed driving state for the distance from the position (corresponding to the data part 5 reading out completing time point) of the data part 5 of the optical card 1 to the ID part 4B, the moving time will be about 6 ms (=4 mm/640 mm/s). The time required for the optical card 1 to decelerate from the constant speed driving state to a speed of zero is usually at least about 20 ms. Therefore, the time required for the optical card 1 to accelerate from the data part 5 reading out completing time point to the constant speed and decelerate from the constant speed to the speed of zero is at least about 26 ms while the driving part 81a completes the data transfer to the host computer 30 in a time of 25 ms from the completion of reading out the data part 5 of the optical card 1. In this embodiment, the optical card 1 starts decelerating for a turning operation after the completion of reading out the recorded data recorded in the optical card 1 and the EDAC circuit 84 completes correcting errors on the recorded data and the DMA circuit 86 can complete transferring the recorded data to the host computer through the interface at least before the speed of the optical card 1 reaches zero.

By the way, in FIG. 24 is shown the case of reading out in the direction of the ID part 4B from the ID part 4A of the optical card 1. But, in the case of reading out in the reverse direction, in the same manner, the errors on the recorded data can be corrected and the transfer of the data can be completed before the speed of the optical card 1 reaches zero.

Further, the EDAC circuit 84 completes correcting errors usually in several ms and therefore completes transferring data faster. Further, if the distances respectively between the ID parts 4A and 4B and the card ends are considered, the above described time of 26 ms to the speed of zero will become longer and therefore the data transfer will be able to be completed with a margin.

The format of the optical card 1 is not limited to one track and one sector (1024 bytes) but will have the same effect even in case one track is divided into a plurality of sectors. It is needless to say that the moving speed and decelerating time are shown only for example.

As explained above, according to the seventh embodiment, after reading out the information recorded in one track of the optical card is completed until the relative movement of the optical card and optical head ends, errors on the information recorded in the optical card are corrected by the error correcting means, the transferring means completes the transfer of the information having had the errors corrected and therefore there are effects that the correction of errors on the data is not required on the host computer side, the waiting time on the host computer side can be reduced to the minimum limit and the processing speed of the whole system can be elevated.

By the way, such embodiment as is made by partly or otherwise combining the above described respective embodiments belongs to the present invention.

What is claimed is:

1. An optical card recording/reproducing apparatus comprising:
a card-like recording medium having a plurality of linear tracks each containing a data portion, in which information can be recorded/reproduced, and ID portions in which identifying information is recorded;
an optical head provided with a light beam generating means for generating light beams, an optical system for condensing said light beams and radiating them to said card-like recording medium and a photodetector for receiving a light reflected by said card-like recording medium through said optical system;
a first moving means for moving either said optical head or said card-like recording medium relative to one another in a direction crossing said tracks;
a second moving means for moving either said optical head or said card-like recording medium relative to one another in a direction parallel with said tracks;
an encoding/correcting process means for performing at least either an encoding process of adding information for detecting and correcting errors to information to be recorded in said card-like recording medium or an error correcting process for detecting and correcting errors on information reproduced from said card-like recording medium; and
a seek control means for moving said light beam to a target track by controlling said first moving means and said second moving means, said seek control means having a target track judging means for judging, during the moving operation by said second moving means, whether or not a track illuminated by said light beam is said target track to be recorded/reproduced according to an output signal of said photo-detector which indicates that the light reflected by said ID portion is received,
wherein said encoding process/error correcting process is performed by said encoding/correcting process means during a period of time which begins with the start of the moving operation of said light beam to said target track by said seek control means and ends before the moving operation by said second moving means reaches a constant speed.

2. An optical card recording/reproducing apparatus according to claim 1 wherein, during the moving operation in said track crossing direction by said first moving means, the operation of said encoding/correcting process means is made.

3. An optical card recording/reproducing apparatus according to claim 2 wherein, in the case of recording information, during the moving operation in said track crossing direction by said first moving means, said encoding process by said encoding/correcting process means is made on the information amount to be recorded in said target track.

4. An optical card recording/reproducing apparatus according to claim 1 wherein said encoding/correcting process means performs said encoding process/error correcting process on each piece of information to be recorded/reproduced in said data portion.

5. An optical card recording/reproducing apparatus according to claim 1, wherein said encoding process/error correcting process means performs said encoding process before it is judged by said target track judging means that the track illuminated by said light beam is said target track.

6. An optical card recording/reproducing apparatus according to claim 1, further comprising a memory means for temporarily storing information which is to be recorded in said target track or reproduced from said target track, wherein said error correcting process is completed on the information in said memory means reproduced from said target track before the relative movement of said optical head or said card-like recording medium in a direction in parallel with said target track is completed.

7. An optical card recording/reproducing apparatus comprising:
a card-like recording medium having a plurality of linear tracks each containing a data portion, in which information can be recorded/reproduced, and ID portions in which identifying information is recorded;
an optical head provided with a light beam generating means for generating light beams, an optical system for condensing said light beams and radiating them to said card-like recording medium and a photodetector for receiving a light reflected by said card-like recording medium through said optical system;

a first moving means moving either said optical head or said card-like recording medium relative to one another in a direction crossing said tracks;

a second moving means moving either said optical head or said card-like recording medium relative to one another in a direction parallel with said tracks;

an encoding/correcting process means for performing at least either an encoding process of adding information for detecting and correcting errors to information to be recorded in said card-like recording medium or an error correcting process for detecting and correcting errors on information reproduced from said card-like recording medium; and a seek control means for moving said light beam to a target track by controlling said first moving means and said second moving means, said control means having a target track judging means for judging, during the moving operation by said second moving means, whether or not a track illuminated by said light beam is said target track to be recorded/reproduced according to an output signal of said photo-detector which indicates that the light reflected by said ID portion is received, wherein, after the moving operation in said direction parallel with said track by said second moving means is started and before a constant speed of said second moving means is established, the operation of said encoding/correcting process means is performed.

8. An optical card recording/reproducing apparatus according to claim 7 wherein, in the case of recording information, the operation of said encoding/correcting process means is said encoding process.

9. An optical card recording/reproducing apparatus comprising:

a card-like recording medium having a plurality of linear tracks each containing a data portion, in which information can be recorded/reproduced, and ID portions in which identifying information is recorded;

an optical head provided with a light beam generating means for generating light beams, an optical system for condensing said light beams and radiating them to said card-like recording medium and a photodetector for receiving a light reflected by said card-like recording medium through said optical system;

a first moving means moving either said optical head or said card-like recording medium relative to one another in a direction crossing said tracks;

a second moving means moving either said optical head or said card-like recording medium relative to one another in a direction parallel with said tracks;

an encoding/correcting process means for performing at least either an encoding process of adding information for detecting and correcting errors to information to be recorded in said card-like recording medium or an error correcting process for detecting and correcting errors on information reproduced from said card-like recording medium;

a target track judging means for judging if a track illuminated by said light beam is a target track to be recorded/reproduced according to an output signal of said photodetector which indicates that the light reflected by said ID portion is received; and a memory means for temporarily storing information, which is to be recorded in said target track or reproduced from said target track;

wherein, after relative movement between said optical head and said card-like recording medium is begun by either said first or said second moving means, in the case of recording information, before it is first judged that the track is said target track, during at leftist either of the moving operation in said direction crossing said tracks by said first moving means or a portion of the moving operation in said direction parallel with said tracks by said second moving means when the speed of said second moving means is either increasing or decreasing, said encoding/correcting process means performs said encoding process on the information stored in said memory means.

10. An optical card recording/reproducing method including an optical head, a card-like recording medium having a plurality of linear tracks each containing a data portion in which information can be recorded/reproduced, and an ID portion, in which identifying information is recorded, and a photodetector, comprising the steps of:

reproducing of information by generating a light beam from the optical head to the tracks of the card-like recording medium and reflecting the light beam to the photodetector;

moving either the optical head or the card-like recording medium relative to one another in a direction crossing the tracks;

moving either the optical head or the card-like recording medium relative to one another in a direction parallel with the tracks;

performing either an encoding process of adding information for detecting and correcting errors to the information to be recorded in the card-like recording medium or an error correcting process of detecting and correcting errors in the information reproduced from the card-like recording medium;

moving the light beam to a target track by controlling the moving operation in the direction crossing the tracks or the moving operation in the direction parallel with the tracks, by judging, during the moving operation in the direction parallel with the tracks, whether or not a track illuminated by the light beam is the target track to be recorded/reproduced according to an output signal of the photodetector which indicates that the light reflected by the ID portion is received;

performing the encoding process/error correcting process during a portion of the moving operation in the direction parallel to the tracks when the moving speed is either increasing or decreasing.

11. An optical card recording/reproducing method including an optical head, a card-like recording medium having a plurality of linear tracks each containing a data portion, in which information can be recorded/reproduced, and an ID portion, in which identifying information is recorded, and a photodetector, comprising the steps of:

reproducing of information by generating a light beam from the optical head to the tracks of the card-like recording medium and reflecting the light beam to the photodetector;

moving either the optical head or the card-like recording medium relative to one another in a direction crossing the tracks;

moving either the optical head or the card-like recording medium relative to one another in a direction parallel with the tracks;

performing either an encoding process of adding information for detecting and correcting errors to the information to be recorded in the card-like recording medium or an error correcting process of detecting and correcting errors in the information reproduced from the card-like recording medium;

moving the light beam to a target track with a seek control means by controlling the moving operation in the direction crossing the tracks or the moving operation in the direction parallel with the tracks, by judging, during the moving operation in the direction parallel with the tracks, whether or not a track illuminated by the light beam is the target track to be recorded/reproduced according to an output signal of the photodetector which indicates that the light reflected by the ID portion is received;

performing the encoding process/error correcting process during a period of time which begins with the start of the moving operation of said light beam to said target track by said seek control means and ends before the moving operation in the direction parallel with the tracks reaches a constant speed.

12. An optical card recording/reproducing method according to claim 11, wherein said processing step further comprises the step of performing the encoding process before it is judged that the track illuminated by the light beam is the target track.

* * * * *